US008166843B2

(12) United States Patent
Kojima et al.

(10) Patent No.: US 8,166,843 B2
(45) Date of Patent: May 1, 2012

(54) SHIFT TRANSMISSION CONTROL DEVICE OF VEHICLE, VEHICLE AND METHOD FOR CONTROLLING SHIFT TRANSMISSION IN VEHICLE

(75) Inventors: Hiroyuki Kojima, Wako (JP); Shigeru Tajima, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 530 days.

(21) Appl. No.: 12/395,863

(22) Filed: Mar. 2, 2009

(65) Prior Publication Data
US 2009/0247358 A1 Oct. 1, 2009

(30) Foreign Application Priority Data

Mar. 26, 2008 (JP) .................................. 2008-081670

(51) Int. Cl.
*F16H 59/00* (2006.01)
*B60W 10/00* (2006.01)
(52) U.S. Cl. ....................................... 74/336 R; 477/80
(58) Field of Classification Search .................... 74/329, 74/330, 335, 336 R; 477/80; 701/62, 66
See application file for complete search history.

(56) References Cited

U.S. PATENT DOCUMENTS

| 6,286,381 | B1 * | 9/2001 | Reed et al. | 74/336 R |
| 7,621,844 | B2 * | 11/2009 | Kishi | 477/120 |
| 7,624,658 | B2 * | 12/2009 | Fahland et al. | 74/331 |
| 2004/0154420 | A1 * | 8/2004 | Katakura | 74/335 |
| 2004/0182187 | A1 * | 9/2004 | Katakura | 74/335 |

FOREIGN PATENT DOCUMENTS
JP 2007-239809 9/2007
* cited by examiner

*Primary Examiner* — Roger Pang
(74) *Attorney, Agent, or Firm* — Ditthavong Mori & Steiner, P.C.

(57) ABSTRACT

A shift transmission control device of a vehicle includes a transmission, a clutch, a shift transmission controller, and a shift inhibition state detector. The shift transmission controller is configured to control the transmission and the clutch. The shift inhibition state detector is configured to detect based on a running state of the vehicle that a predetermined shift inhibition condition is satisfied. The transmission is capable of providing a preliminary change gear ratio while the predetermined change gear ratio at which the rotational drive force is transmitted to the drive wheel is maintained. The shift transmission controller is configured to control the transmission to inhibit a change of the predetermined change gear ratio at which the rotational drive force is transmitted to the drive wheel and to provide the preliminary change gear ratio in response to the running state of the vehicle when the shift inhibition condition is satisfied.

12 Claims, 13 Drawing Sheets

SHIFT TRANSMISSION CONTROL DEVICE OF VEHICLE, VEHICLE AND METHOD FOR CONTROLLING SHIFT TRANSMISSION IN VEHICLE

CROSS-REFERENCE TO RELATED APPLICATIONS

The present application claims priority under 35 U.S.C. §119 to Japanese Patent Application. No. 2008-081670, filed Mar. 26, 2008. The contents of this application are incorporated herein by reference in their entirety.

BACKGROUND OF THE INVENTION

1. Field of the Invention

The present invention relates to a shift transmission control device of a vehicle, a vehicle, and a method for controlling shift transmission in a vehicle.

2. Discussion of the Background

Conventionally, there has been known a sequential-type automatic manual transmission which executes a shift operation automatically or semi-automatically by receiving a gear shift instruction from a rider by way of a shift switch or the like, wherein the shift operation is performed by driving a clutch which transmits a rotational drive force of a drive source such as an engine or the like to a transmission or interrupts the transmission of the rotational drive force and a shift drum which drives a shift fork of the transmission respectively using actuators.

Further, there has been also known an ABS (anti-lock brake system) which is configured to realize stable braking by instantaneously and intermittently releasing the application of a braking force when locking of a wheel is detected at the time of deceleration.

JP-A-2007-239809 discloses a shift transmission control device of an automatic manual transmission which performs a shift operation by operating a shift switch, wherein during an operation of an ABS, the shift-down of the transmission is not executed even when a rider performs the shift-down operation. Due to such constitution, it is possible to prevent a phenomenon that the shift-down is performed during the operation of the ABS so that a rotational drive force transmitted to a drive wheel is changed.

The contents of JP-A-2007-239809 are incorporated herein by reference in their entirety.

However, the technique disclosed in patent document 1 merely inhibits the shift down during the ABS operation and hence, for example, when a vehicle is largely decelerated during the ABS operation, at a point of time that the ABS is released, shift gears arranged on a side having higher speeds compared to a vehicle speed remain in a selected state. In this case, to immediately re-accelerate the vehicle after releasing the ABS, it is necessary to execute the shift down of first speed to several speeds by rotating a shift drum and hence, there may be a case that a quick response can not be obtained for an acceleration operation.

Further, the technique disclosed in patent document 1 is configured to execute a shift inhibition control under the condition that the ABS is operated and hence, no consideration has been taken with respect to various controls to be executed when predetermined shift inhibition condition is established without being limited to the control executed at the time of performing the ABS operation.

SUMMARY OF THE INVENTION

According to one aspect of the present invention, a shift transmission control device of a vehicle includes a transmission, a clutch, a shift transmission controller, and a shift inhibition state detector. The transmission is configured to transmit a rotational drive force generated by a power source to a drive wheel at a predetermined change gear ratio. The clutch is configured to connect and disconnect the power source and the drive wheel in order to and not to transmit the rotational drive force. The shift transmission controller is configured to control the transmission and the clutch. The shift inhibition state detector is configured to detect based on a running state of the vehicle that a predetermined shift inhibition condition is satisfied. The transmission is capable of providing a preliminary change gear ratio while the predetermined change gear ratio at which the rotational drive force is transmitted to the drive wheel is maintained. The shift transmission controller is configured to control the transmission to inhibit a change of the predetermined change gear ratio at which the rotational drive force is transmitted to the drive wheel and to provide the preliminary change gear ratio in response to the running state of the vehicle when the shift inhibition condition is satisfied.

According to another aspect of the present invention, a vehicle includes a power source, a drive wheel, a transmission, a clutch, a shift transmission, and a shift inhibition state detector. The transmission is configured to transmit a rotational drive force generated by the power source to the drive wheel at a predetermined change gear ratio. The clutch is configured to connect and disconnect the power source and the drive wheel in order to and not to transmit the rotational drive force. The shift transmission controller is configured to control the transmission and the clutch. The shift inhibition state detector is configured to detect based on a running state of the vehicle that a predetermined shift inhibition condition is satisfied. The transmission is capable of providing a preliminary change gear ratio while the predetermined change gear ratio at which the rotational drive force is transmitted to the drive wheel is maintained. The shift transmission controller is configured to control the transmission to inhibit a change of the predetermined change gear ratio at which the rotational drive force is transmitted to the drive wheel and to provide the preliminary change gear ratio in response to the running state of the vehicle when the shift inhibition condition is satisfied.

According to further aspect of the present invention, a method for controlling shift transmission in a vehicle includes transmitting a rotational drive force generated by a power source to a drive wheel at a predetermined change gear ratio. The power source and the drive wheel are connected and disconnected in order to and not to transmit the rotational drive force. It is detected based on a running state of the vehicle that a predetermined shift inhibition condition is satisfied. A change of the predetermined change gear ratio at which the rotational drive force is transmitted to the drive wheel is inhibited when the shift inhibition condition is satisfied. A preliminary change gear ratio is provided in response to the running state of the vehicle while the predetermined change gear ratio is maintained when the shift inhibition condition is satisfied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
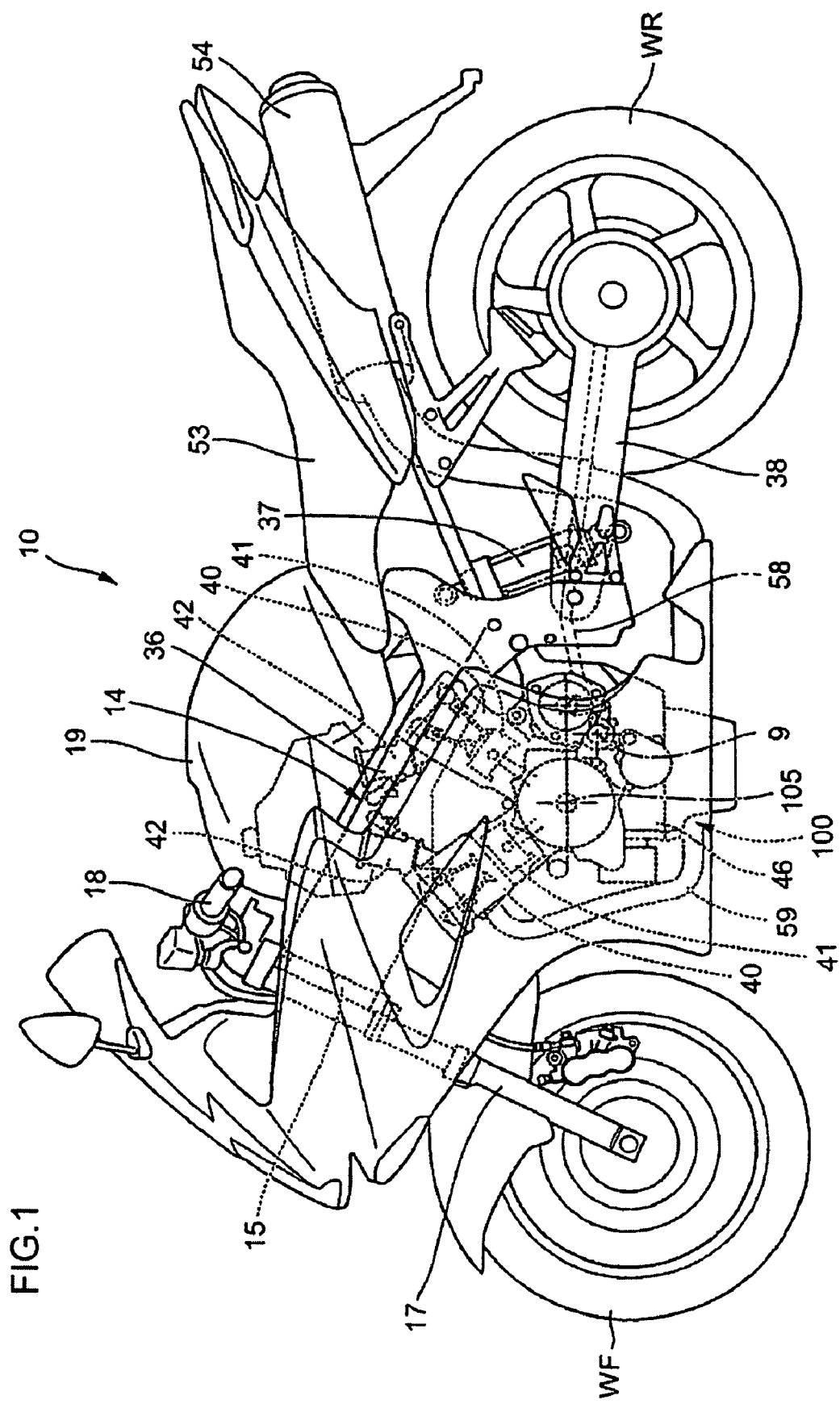
FIG. 1 is a side view of a motorcycle to which a clutch control device according to one embodiment of the present invention is applied.

Embodiments will now be described with reference to the accompanying drawings, wherein like reference numerals designate corresponding or identical elements throughout the various drawings.

Figure 2:
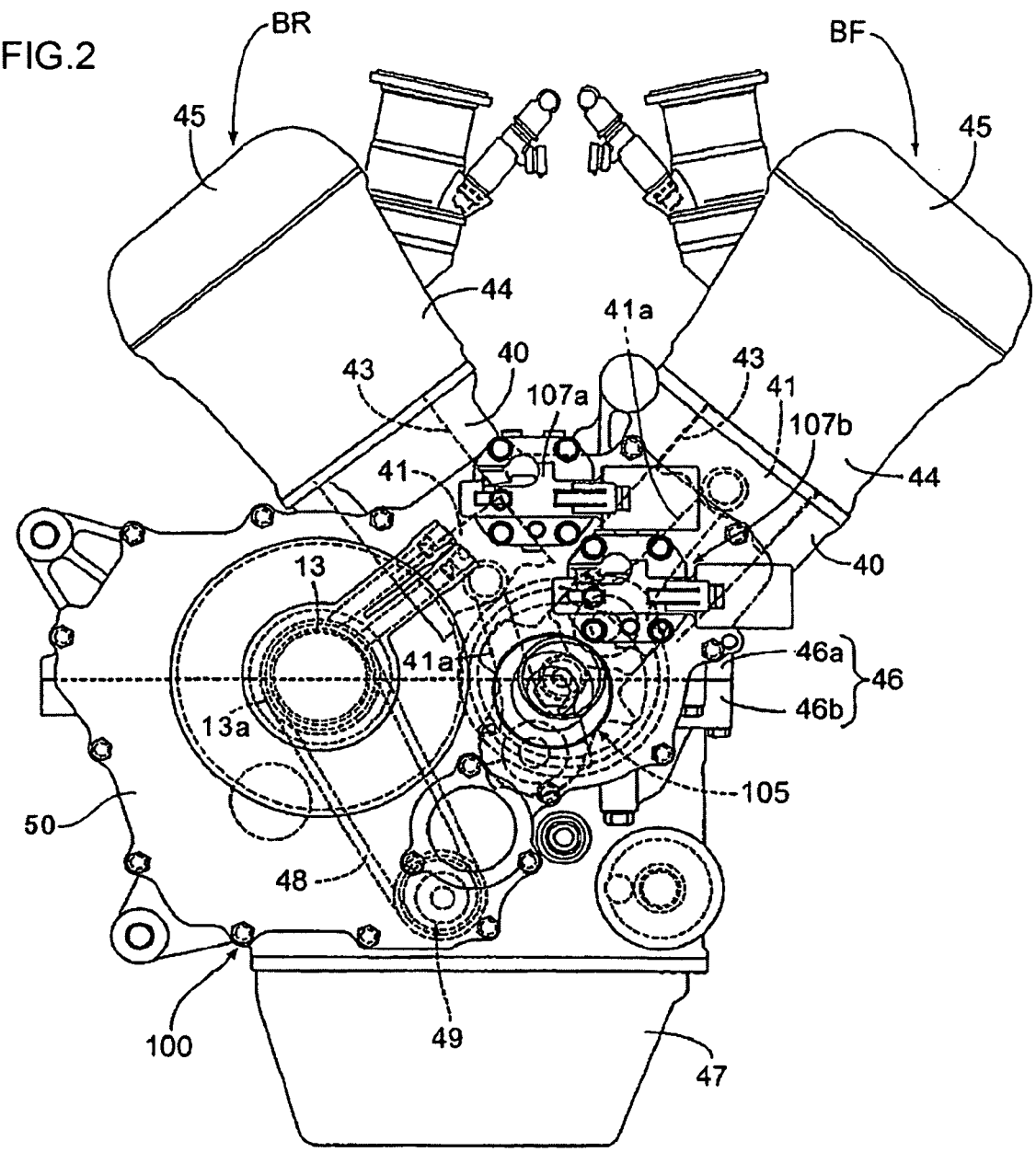
FIG. 2 is a left side view of an engine which constitutes a power source of the motorcycle.

Hereinafter, a preferred embodiment of the present invention is explained in detail in conjunction with drawings. FIG. 1 is a side view of a motorcycle 10 to which a clutch control device according to one embodiment of the present invention is applied. FIG. 2 is a left side view of an engine 100 which is used as a power source of the motorcycle 10. A vehicle body frame 14 of the motorcycle 10 includes a pair of left and right main pipes 36, and a head pipe 15 is mounted on a front side of the main pipes 36 in the longitudinal direction of the vehicle body. A pair of left and right front forks 17 which rotatably and pivotally supports a front wheel WF and supports a steering handle 18 is rotatably and pivotally supported by the head pipe 15.

The engine 100 which is suspended by the main pipe 36 downwardly is a V-type 4-cylinder engine which arranges front and rear cylinders thereof in a V form with a predetermined angle therebetween. These four cylinders have the substantially same constitution with respect to a piston 41 which slides in a cylinder block 40, a valve mechanism or the like. A crankcase 46 houses therein a crankshaft 105 which rotatably and pivotally supports a connecting rod 41a (see FIG. 2) for supporting the piston 41, and a main shaft 13 and a counter shaft on which a plurality of gear pairs (gear units) which constitute a transmission are mounted.

Between the front and rear cylinder blocks, air funnels 42 which introduce fresh air passing an air cleaner box arranged below a fuel tank 19 to intake ports of the respective cylinders are arranged. A fuel injection valve is mounted on the respective air funnels 42. A muffler 54 is arranged below a seat 53. This muffler 54 is provided for discharging a combustion gas which is guided to a rear side of the vehicle body by an exhaust pipe 59 which is connected to an exhaust port of the cylinder block 40.

On a rear lower portion of the main pipe, a swing arm 38 which is suspended by a shock unit 37 and rotatably and pivotally supports a rear wheel WR is swingably and pivotally supported. In the inside of the swing arm 38, a drive shaft 58 which transmits a rotational drive force of the engine outputted from the counter shaft 9 to the rear wheel WR constituting a drive wheel is arranged.

To explain the constitution of this embodiment in conjunction with FIG. 2, a front bank BF and a rear bank BR which constitute the engine 100 are respectively constituted of a cylinder head 44 which is mounted on an upper portion of the cylinder block 40 and houses the valve mechanism therein and a head cover 45 which covers an upper end of the cylinder head 44. The piston 41 slides on an inner peripheral portion of a cylinder 43 which is formed in the cylinder block 40. The crankcase 46 is constituted of an upper case half body 46a which is integrally formed with the cylinder block 40 and a lower case half body 46b on which an oil pan 47 is mounted. Further, a water pump 49 for feeding cooling water to the engine 100 under pressure is rotatably driven by an endless chain 48 which is wound around a sprocket wheel 13a mounted on the main shaft 13. On a right side surface of the crankcase 46 in the vehicle width direction, a clutch cover 50 is mounted.

The engine 100 according to this embodiment is configured such that a hydraulic clutch which performs the engagement/disengagement of a rotational drive force between the engine 100 and the transmission is of a twin-clutch which is constituted of a first clutch and a second clutch and, at the same time, an oil pressure supplied to the twin clutch is controlled by an actuator. Further, on a left side portion of the engine 100, a first valve 107a and a second valve 107b which constitute the actuator for controlling both first and second clutches are mounted. The constitution of the transmission to which the twin-clutch is applied is explained later.

Figure 3:
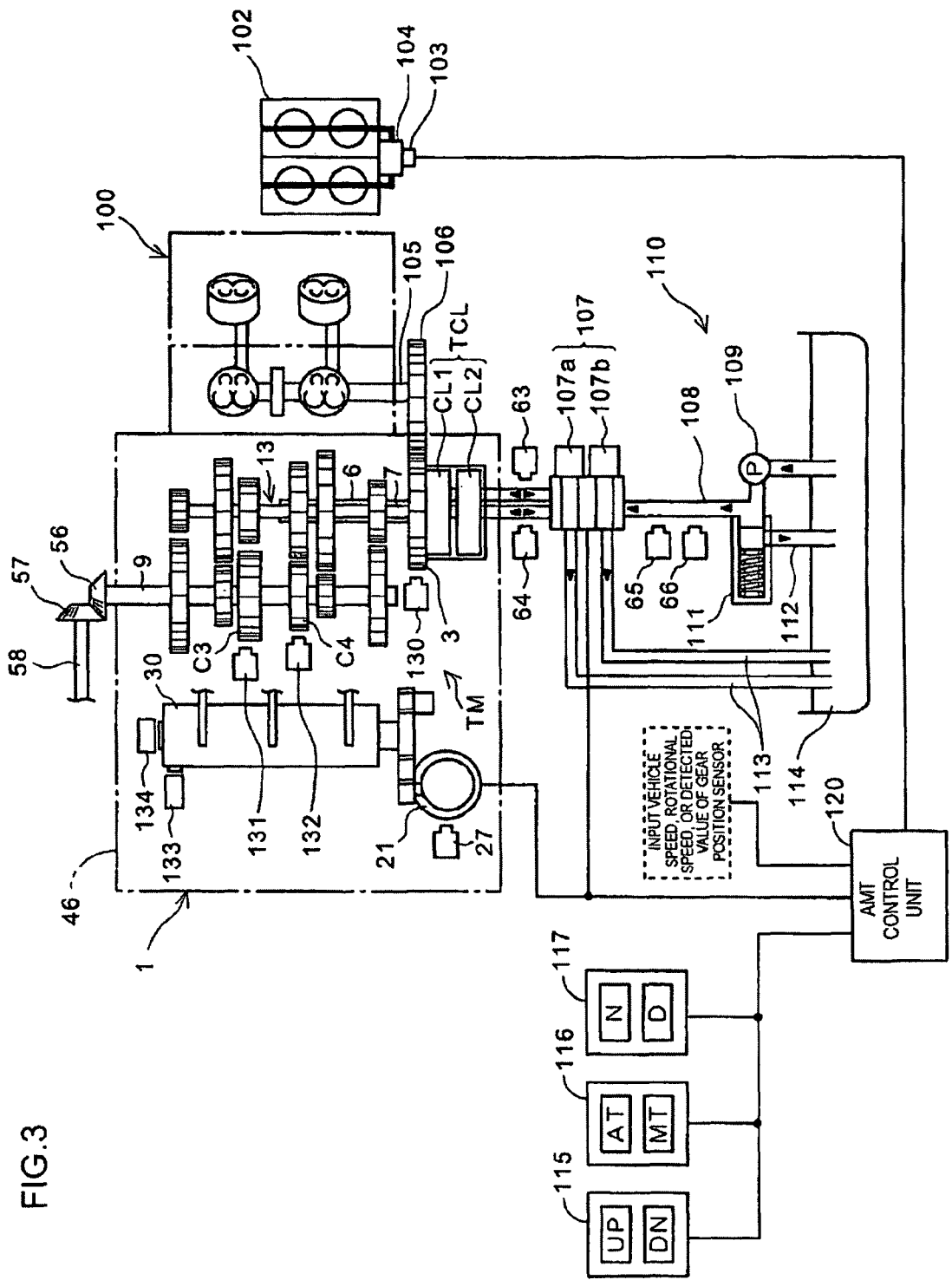
FIG. 3 is a system constitutional view of an AMT and peripheral devices of the AMT.

FIG. 3 is a view showing the system constitution of an automatic manual transmission (hereinafter, referred to as an AMT) 1 as an automatic transmission and peripheral devices of the AMT1. The AMT1 is constituted as a twin-clutch-type shift device which engages/disengages the rotational drive force of the engine using two clutches mounted on the main shaft. A drive control of the AMT 1 housed in the crankcase 46 is performed by a clutch-use hydraulic device 110 and an AMT control unit 120. The AMT control unit 120 includes a clutch control means which performs a drive control of the valves 107. Further, the engine 100 includes a throttle-by-wire type throttle body 102, and the throttle body 102 includes a motor 104 for opening and closing the throttle.

The AMT1 includes a transmission TM of six speeds in the advancing direction, a twin clutch TCL constituted of a first clutch CL1 and a second clutch CL2, a shift drum 30, and a shift control motor 21 which rotates the shift drum 30. A large number of gears constituting the transmission TM are respectively joined to or loosely fitted on the main shaft 13 and the counter shaft 9. The main shaft 13 is constituted of an inner main shaft 7 and an outer main shaft 6, wherein the inner main shaft 7 is joined to the first clutch CL1, and the outer main shaft 6 is joined to the second clutch CL2. On the main shaft 13 and the counter shaft 9, shift gears which are displaceable in the axial directions of the main shaft 13 and the counter shaft 9 are respectively mounted, and end portions of shift forks 71, 72, 81, 82 (see FIG. 5) are respectively engaged with a plurality of guide grooves which are formed in the shift gears and the shift drum 30.

A primary drive gear 106 is joined to an output shaft of the engine 100, that is, to the crankshaft 105, and the primary drive gear 106 is meshed with a primary driven gear 3. The primary driven gear 3 is joined to the inner main shaft 7 by way of the first clutch CL1 and, at the same time, is joined to the outer main shaft 6 by way of the second clutch CL2. Further, the AMT1 includes an inner main shaft rotational speed (rotational speed) sensor 131 which detects a rotational speed of the inner main shaft 7 by measuring a rotational speed of a predetermined shift gear mounted on the counter shaft 9 and an outer main shaft rotational speed (rotational speed) sensor 132 which detects a rotational speed of the outer main shaft 6 by measuring a rotational speed of a predetermined shift gear mounted on the counter shaft 9.

The inner main shaft rotational speed sensor 131 is configured to detect a rotational speed of a driven-side shift gear C3 which is meshed with a shift gear mounted on the inner main shaft 7 in a non-rotatable manner and, at the same time, is rotatably mounted on the counter shaft 9 in a non-slidable manner. Further, the outer main shaft rotational speed sensor 132 is configured to detect a rotational speed of a driven-side shift gear C4 which is meshed with a shift gear mounted on the outer main shaft 6 in a non-rotatable manner and, at the same time, is rotatably mounted on the counter shaft 9 in a non-slidable manner. The detailed explanation with respect to gear train mounted on the respective shafts is described later.

A bevel gear 56 is joined to an end portion of the counter shaft 9 and the bevel gear 56 is meshed with a bevel gear 57 which is joined to the drive shaft 58 and hence, a rotational drive force of the counter shaft 9 is transmitted to the rear wheel WR. Further, in the inside of the AMT1, an engine rotational speed sensor 130 which is arranged to face an outer periphery of the primary driven gear 3 in an opposed manner, a gear position sensor 134 which detects a gear position of the transmission TM based on a rotational position of the shift drum 30, a shifter sensor 27 which detects a rotational position of a shifter driven by the shift control motor 21, and a neutral switch 133 which detects a fact that the shift drum 30 is positioned at a neutral position are provided. Further, a throttle opening sensor 103 which detects throttle opening is mounted on the throttle body 102.

The clutch-use hydraulic device 110 according to this embodiment is configured to use lubrication oil for the engine 100 and operation oil for driving the twin clutch in common. The clutch-use hydraulic device 110 includes an oil tank 114 and a passage 108 for supplying oil (operation oil) in the oil tank 114 to the first clutch CL1 and the second clutch CL2. An oil pressure pump 109 which constitutes an oil-pressure supply source and a valve (electromagnetic control valve) 107 which constitutes an actuator are provided to the passage 108, and a regulator 111 provided for holding an oil pressure supplied to the valve 107 at a fixed value is provided to a return passage 112 which is connected to the passage 108. The valve 107 is constituted of the first valve 107a which applies an oil pressure to the first clutch CL1 and the second valve 107b which applies an oil pressure to the second clutch CL2, and an oil-return passage 113 is connected to the first valve 107a and the second valve 107b respectively.

In a passage which connects the first valve 107a and the first clutch CL1, a first oil-pressure sensor 63 which measures an oil pressure generated in the passage, that is, an oil pressure generated in the first clutch CL1 is arranged. In the same manner, in a passage which connects the second valve 107b and the second clutch CL2, a second oil-pressure sensor 64 which measures an oil pressure generated in the second clutch CL2 is arranged. Further, in the passage 108 which connects the oil pressure pump 109 and the valve 107, a main oil pressure sensor 65 and an oil temperature sensor 66 which constitutes an oil temperature detection means are arranged.

To the AMT control unit 120, a mode switch 116 which performs a changeover of a shift mode between an automatic shift (AT) mode and a manual shift (MT) mode, a shift selection switch 115 which executes the shift instruction of a "shift-up (UP)" operation or a "shift-down (DN)" operation, and a neutral selection switch 117 which performs a changeover of a shift position between "neutral (N)" and "drive (D)" are connected. The AMT control unit 120 includes a central processing unit (CPU), and is configured to automatically or semi-automatically change over a shift position of the AMT1 by controlling the valve 107 and the shift control motor 21 in response to output signals of the respective sensors and switches.

The AMT control unit 120, when the AT mode is selected, automatically changes over the shift position in response to information such as a vehicle speed, an engine rotational speed, or throttle opening. On the other hand, when the MT mode is selected, the AMT control unit 120 shifts up or shifts down the transmission TM in accordance with an operation of the shift selection switch 115. Here, the AMT control unit 120 may be also configured such that even when the MT mode is selected, the AMT control unit 120 can execute an auxiliary automatic shift control for preventing the excessive rotation or a stall of the engine.

In the clutch-use hydraulic device 110, an oil pressure is applied to the valve 107 by the oil pressure pump 109, and the oil pressure is controlled by the regulator 111 such that the oil pressure does not exceed an upper limit value. When the valve 107 is opened based on the instruction from the AMT control unit 120, the oil pressure is applied to the first clutch CL1 or the second clutch CL2 so that the primary driven gear 3 is connected to the inner main shaft 7 or the outer main shaft 6 by way of the first clutch CL1 or the second clutch CL2. Further, when the valve 107 is closed and the application of the oil pressure is stopped, the first clutch CL1 and the second clutch CL2 are biased in the direction which cuts the connection between the primary driven gear 3 and the inner main shaft 7 or the outer main shaft 6 using a return spring (not shown in the drawing) incorporated in the first clutch CL1 and the second clutch CL2 respectively.

The valve 107 which drives both clutches by opening/closing passages which connect the passage 108 and both clutches respectively is configured to arbitrarily change a time necessary for bringing the passage into a full-open state from a full-close state by adjusting a drive signal using the AMT control unit 120.

The shift control motor 21 rotates the shift drum 30 in accordance with the instruction from the AMT control unit 120. When the shift drum 30 is rotated, the shift forks are displaced in the axial direction of the shift drum 30 along shapes of the guide grooves formed in an outer periphery of the shift drum 30. Along with the displacement of the shift forks, the meshing of the gears on the counter shaft 9 and the gears on the main shaft 13 is changed thus changing over the transmission between a shift-up possible state and a shift-down possible state.

In the AMT1 according to this embodiment, the inner main shaft 7 which is joined to the first clutch CL1 supports the odd-numbered-speed gear pairs (first, third, fifth gears) thereon, and the outer main shaft 6 which is joined to the second clutch CL2 supports the even-numbered-speed gear pairs (second, fourth, sixth gears) thereon. Accordingly, for example, during a time that the vehicle travels using the odd-numbered-speed gear pairs, the supply of oil pressure to the first clutch CL1 is held and the engagement state of the clutch CL1 is maintained. Further, in performing a shift change, by preliminarily changing the meshing of the gears by rotating the shift drum 30, it is possible to complete the shift operation by only changing over the engagement states of both clutches.

Figure 4:
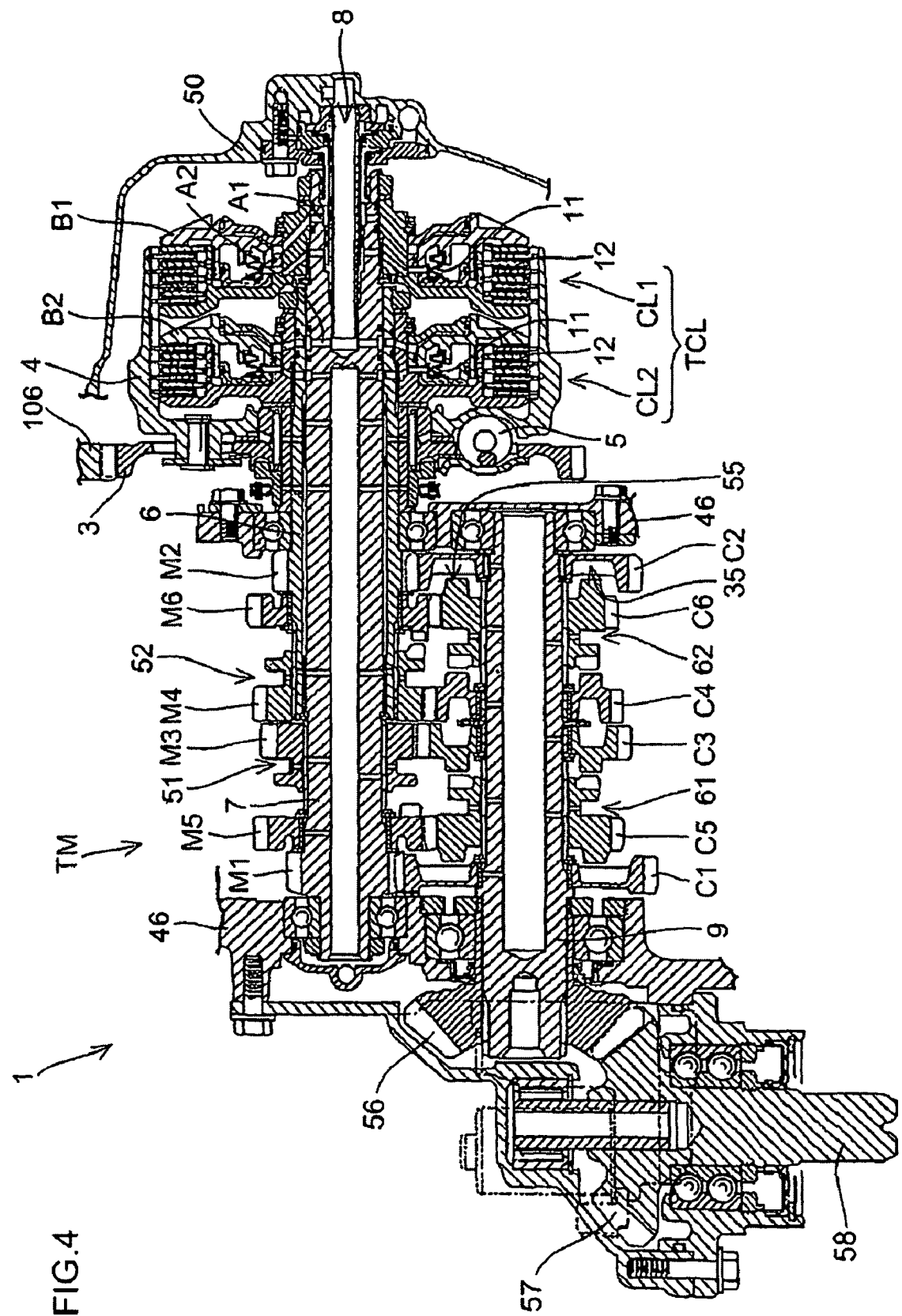
FIG. 4 is an enlarged cross-sectional view of a transmission.

FIG. 4 is an enlarged cross-sectional view of the transmission TM. In FIG. 4, symbols equal to the symbols used in the above-mentioned constitution indicate identical or similar parts. The rotational drive force which is transmitted to the primary driven gear 3 having a shock absorption mechanism 5 from the crankshaft 105 of the engine 100 by way of the primary drive gear 106 is outputted to the counter shaft 9 on which the bevel gear 56 is mounted from the twin clutch TCL, by way of the outer main shaft 6, the inner main shaft 7 which is rotatably and pivotally supported by the outer main shaft 6, and six gear pairs which are arranged between the main shafts (the outer main shaft 6 and the inner main shaft 7) 13 and the counter shaft 9. The rotational drive force which is transmitted to the bevel gear 56 is transmitted to the drive shaft 58 having, due to the meshing of the bevel gear 56 and the bevel gear 57, the rotational direction thereof bent in the rearward direction of the vehicle body.

The transmission TM includes six pairs of shift gears between the main shaft and the counter shaft, and can select the pair of gears through which the rotational drive force is outputted by the combination of positions of slidable gears which are mounted on the respective shafts in the axially slidable manner and an engagement/disengagement state of the first clutch CL1 and the second clutch CL2. The twin clutch TCL is arranged in a clutch case 4 which is rotated together with the primary driven gear 3. The first clutch CL1 is mounted on the inner main shaft 7 in a non-rotatable manner, while the second clutch CL2 is mounted on the outer main shaft 6 in a non-rotatable manner. Between the clutch case 4 and both clutches, a clutch plate 12 which is constituted of four pieces of drive friction discs supported on the clutch case 4 in a non-rotatable manner and four driven friction discs supported on both clutches in a non-rotatable manner is arranged.

The first clutch CL1 and the second clutch CL2 are configured such that when the oil pressure is supplied to the first clutch CL1 and the second clutch CL2 from the oil pressure pump 109 (see FIG. 3), a friction force is generated on the clutch plate 12 so that the first clutch CL1 and the second clutch CL2 are changed over to the engagement state. In a wall surface of the clutch cover 50 which is mounted on the crankcase 46, a distributor 8 which forms two oil pressure passages having a duplicate pipe constitution in the inside of the inner main shaft 7 is embedded. When an oil pressure is applied to the distributor 8 through the first valve 107a and the oil pressure is applied to an oil passage A1 formed in the inner main shaft 7, a piston B1 is made to slide leftward in the drawing against a resilient force of the resilient member 11 such as a spring so that the first clutch CL1 is changed over to an engagement state. On the other hand, when an oil pressure is applied to an oil passage A2, a piston B2 is made to slide leftward in the drawing so that the second clutch CL2 is changed over to an engagement state. The pistons B1, B2 of both clutches CL1, CL2 are configured such that when the application of the oil pressure is stopped, the pistons return to respective initial positions thereof due to the resilient force of the resilient member 11.

Due to the above-mentioned constitution, although the rotational drive force of the primary driven gear 3 merely rotates the clutch case 4 unless the oil pressure is applied to the first clutch CL1 or the second clutch CL2, with the application of the oil pressure, the rotational drive force of the primary driven gear 3 can rotate the outer main shaft 6 or the inner main shaft 7 integrally with the clutch case 4. Here, by adjusting a magnitude of the oil pressure to be applied, it is also possible to obtain a half-clutch state.

The inner main shaft 7 which is connected to the first clutch CL1 supports drive gears M1, M3, and M5 of the odd-numbered-speed gear pairs (first, third, fifth gears). The first-speed drive gear M1 is integrally formed with the inner main shaft 7. The third-speed drive gear M3 is mounted on the inner main shaft 7 in an axially slidable manner and in a circumferentially non-rotatable manner by spline engagement, and the fifth-speed drive gear M5 is mounted on the inner main shaft 7 in an axially non-slidable manner and in a circumferentially rotatable manner.

On the other hand, the outer main shaft 6 which is connected to the second clutch CL2 supports drive gears M2, M4, and M6 of the even-numbered-speed gear pairs (second, fourth, sixth gears). The second-speed drive gear M2 is integrally mounted on the outer main shaft 6. The fourth-speed drive gear M4 is mounted on the outer main shaft 6 in an axially slidable manner and in a circumferentially non-rotatable manner by spline engagement, and the sixth-speed drive gear M6 is mounted on the outer main shaft 6 in an axially non-slidable manner and in a circumferentially rotatable manner.

Further, the counter shaft 9 supports driven gears C1 to C6 which are meshed with the drive gears M1 to M6. The first-speed to fourth-speed driven gears C1 to C4 are mounted on the counter shaft 9 in an axially non-slidable manner and in a circumferentially rotatable manner, and the fifth-speed and sixth-speed driven gears C5, C6 are mounted on the counter shaft 9 in an axially slidable manner and in a circumferentially non-rotatable manner.

Out of the above-mentioned gear trains, the drive gears M3, M4 and the driven gears C5, C6, that is, "slidable gears" which are slidable in the axial direction are configured to be slid along with operations of the shift forks described later. In the respective slidable gears, engaging grooves 51, 52, 61, 62 with which pawl portions of the shift forks are engaged are respectively formed. Here, as described above, the inner main shaft rotational speed sensor 131 (see FIG. 3) detects a rotational speed of the third-speed driven gear C3, and the outer main shaft rotational speed sensor 132 detects a rotational speed of the fourth-speed driven gear C4.

Further, the shift gears (drive gears M1, M2, M5, M6 and the driven gears C1 to C4) other than the above-mentioned slidable gears, that is, "non-slidable gears" which are not slidable in the axial direction are respectively configured to perform the disengagement/engagement of the rotational drive force with the neighboring slidable gears arranged adjacent to the non-slidable gears. Due to the above-mentioned constitution, the twin clutch shift device 1 according to this embodiment can arbitrarily select one gear pair which transmits the rotational drive force due to the combination of positions of the slidable gears and the engagement/disengagement state of both clutches CL1, CL2.

This embodiment adopts a dog clutch mechanism for transmitting the rotational drive force between the slidable gears and the non-slidable gears. The dog clutch mechanism is configured to transmit the rotational drive force with a small loss by allowing dog teeth and dog holes to be meshed with each other in a concave-and-convex shape. In this embodiment, for example, four dog teeth 55 which are formed on the sixth-speed driven gear C6 are meshed with four dog holes 35 which are formed in the second-speed driven gear C2.

Figure 5:
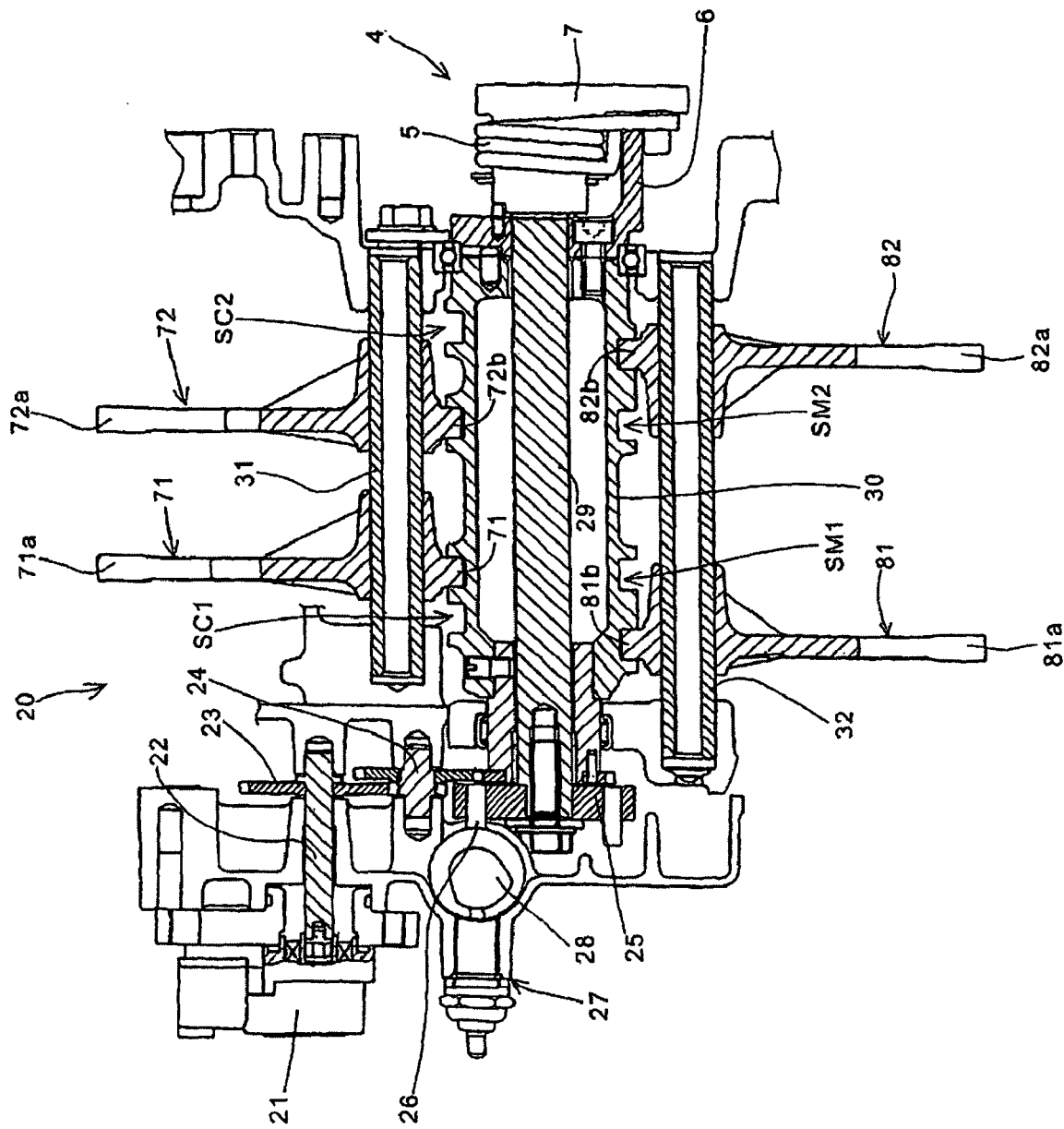
FIG. 5 is an enlarged cross-sectional view of a shift mechanism.
Figure 6:
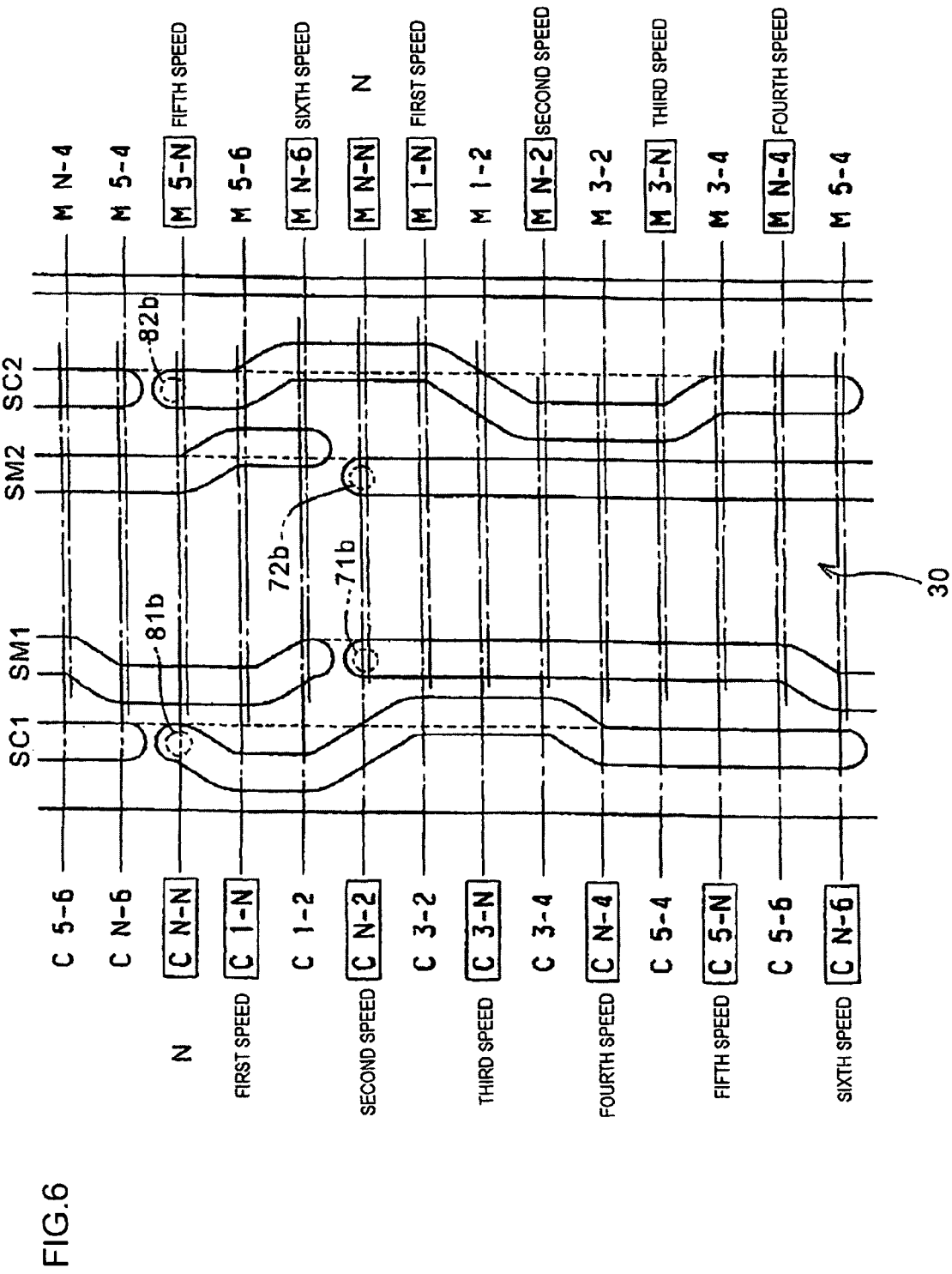
FIG. 6 is a developed view showing shapes of guide grooves formed in a shift drum.

FIG. 5 is an enlarged cross-sectional view of a shift mechanism 20. Further, FIG. 6 is a developed view showing shapes of the guide grooves formed in the shift drum 30. The shift mechanism 20, for driving the above-mentioned four slidable gears, includes four shift forks 71, 72, 81, 82 which are slidably mounted on two guide shafts 31, 32. Four shift forks 71, 72, 81, 82 are respectively provided with guide pawls (71a, 72a, 81a, 82a) which are engaged with the slidable gears, and cylindrical projecting portions (71b, 72b, 81b, 82b) which are engaged with the guide grooves formed in the shift drum 30.

On the guide shaft 31, the shift fork 71 which is engaged with the third-speed drive gear M3 and the shift fork 72 which is engaged with the fourth-speed drive gear M4 are mounted. Further, on another guide shaft 32, the shift fork 81 which is engaged with the fifth-speed driven gear C5 and the shift fork 82 which is engaged with the sixth-speed driven gear C6 are mounted.

In a surface of the shift drum 30 which is arranged parallel to the guide shafts 31, 32, guide grooves SM1, SM2 with which the main-shaft-side shift forks 71, 72 are engaged and guide grooves SC1, SC2 with which the counter-shaft-side shift forks 81, 82 are engaged are formed. Due to such constitution, the slidable gears M3, M4, C5, C6 are driven along shapes of four guide grooves along with the rotational operation of the shift drum 30.

The shift drum 30 is rotatably driven to a predetermined position by operating the shift control motor 21. A rotational drive force of the shift control motor 21 is transmitted to a shift drum shaft 29 which supports the hollow cylindrical shift drum 30 by way of a first gear 23 which is fixed to a rotary shaft 22 and a second gear 24 which is meshed with the first gear 23. The shift drum shaft 29 is connected to the shift drum 30 by way of a lost motion mechanism 4.

The lost motion mechanism 4 is a mechanism which prevents an excessive load from being applied to the shift control motor 21. That is, the lost motion mechanism 4 is configured such that the shift drum shaft 29 and the shift drum 30 are joined to each other by way of a torsional coil spring 5 and hence, for example, even when the dog clutches are not meshed with each other so that the shift drum 30 is not rotated as expected, the lost motion mechanism 4 temporarily absorbs the movement of the shift control motor 21 by the torsional coil spring 5 thus preventing the excessive load from being applied to the shift control motor 21. The lost motion mechanism 4 is constituted of a drive rotor 7 which is mounted on an end portion of the shift drum shaft 29, a driven rotor 6 which is mounted on an end portion of the shift drum 30, and the torsional coil spring 5 which joins the drive rotor 7 and the driven rotor 6. Due to such constitution, when the shift drum 30 is brought into a rotatable state in a state that the movement of the shift control motor 21 is temporarily absorbed, the shift drum 30 is rotated to a predetermined position due to a resilient force of the torsional coil spring 5.

The gear position sensor 134 (see FIG. 3) is arranged to detect a rotational angle of the shift drum 30 or the driven rotor 6 for detecting an actual rotational angle of the shift drum 30. The shifter sensor 27 can detect whether or not the shift control motor 21 is arranged at a predetermined position based on a position of a cam 28 which is rotated by a pin 26 embedded in a shifter 25 fixed to the shift drum shaft 29.

A relationship between a rotational position of the shift drum 30 and positions of four shift forks is explained in conjunction with the developed view shown in FIG. 6. The guide shafts 31, 32 are arranged at positions separated from each other by approximately 90° in the circumferential direction with respect to a rotational axis of the shift drum 30. For example, when the rotational position of the shift drum 30 is arranged at the neutral position (N), the shift forks 81, 82 are arranged at a position "C N-N" on a left side of the drawing, while the shift forks 71, 72 are arranged at a position "M N-N" on a right side of the drawing. In the drawing, positions of the cylindrical projecting portions (71b, 72b, 81b, 82b) of the respective shift forks when the shift drum 30 is arranged at the neutral position are indicated by a broken-line circle. Further, predetermined positions of the shift forks 81, 82 which follow the position "C N-N" on the left side of the drawing and predetermined positions of the shift forks 71, 72 which follow the position "M N-N" on the right side of the drawing are indicated at intervals of 30°. Here, in the drawing, out of the predetermined rotational angles, "neutral standby positions" described later are respectively surrounded by a rectangular frame.

With respect to the slide position of the shift fork determined by the respective guide grooves, the guide grooves SM1, SM2 on a main shaft side take two positions consisting of "left position" and "right position", while the guide grooves SC1, SC2 on a counter shaft side take three positions consisting of "left position", "neutral position" and "right position".

With respect to the respective shift forks when the shift drum 30 takes the neutral position, the shift fork 81 takes the neutral position, the shift fork 82 takes the neutral position, the shift fork 71 takes the right position and the shift fork 72 takes the left position. This state is a state in which four slidable gears driven by the respective shift forks are meshed with none of the neighboring non-slidable gears. Accordingly, even when the first clutch CL1 or the second clutch CL2 is engaged, there is no possibility that a rotational drive force of the primary driven gear 3 is transmitted to the counter shaft 9.

Next, when the shift drum 30 is rotated to the positions ("C 1-N" and "M 1-N") corresponding to the first-speed gear from the above-mentioned neutral position, the shift fork 81 is changed over from the neutral position to the left position and hence, the fifth speed driven gear C5 is changed over from the neutral position to the left position. Accordingly, the fifth speed driven gear C5 is meshed with the first speed driven gear C1 by way of the dog clutch thus bringing a state in which the rotational drive force can be transmitted. In such a state, when the first clutch CL1 is changed over to an engagement state, the rotational drive force is transmitted in order of the inner main shaft 7→the first speed drive gear M1→the first speed driven gear C1→the fifth speed driven gear C5→the counter shaft 9.

Then, the shift to the first speed gear is completed, the shift drum 30 is automatically rotated in the shift up direction by 30°. This rotational operation is referred to as "up-side preliminary shift" for completing the shift only by changing over the engagement state of the twin clutch TCL which is performed in response to the supply of a shift instruction to the second speed. Due to such up-side preliminary shift, two guide shafts are moved to the left and right displayed positions "C 1-2", and "M 1-2" in the drawing.

With respect to the change of the guide groove caused by such an up-side preliminary shift, the guide groove SC2 is changed merely from the neutral position to the right position. Accordingly, the shift fork 82 is moved to the right position so that the sixth speed driven gear C6 is meshed with the second speed driven gear C2 by way of the dog clutch. The second clutch CL2 is in a disengagement state at a point of time that the up-side preliminary shift is completed and hence, the outer main shaft 6 is rotated following the rotation of the inner main shaft 7 due to viscosity of a lubricant filled in a space between the outer main shaft 6 and the inner main shaft 7.

Due to the above-mentioned up-side preliminary shift, the preparation for transmitting the rotational drive force by way of the second speed gear is finished. When a shift instruction for the second speed is outputted in such a state, the first clutch CL1 is disengaged and, at the same time, the second clutch CL2 is changed over to an engagement state. Due to such a transfer operation of the clutches, the shift operation to the second speed gear is rapidly completed without causing the interruption of the rotational drive force.

Then, upon completion of the shift operation from the first speed to the second speed, an up-side preliminary shift for completing the shift operation from the second speed to the third speed only with the transfer of clutches is performed. In this up-side preliminary shift from the second speed to the third speed, the guide shaft on the counter shaft side is moved to a position "C 3-2" from the position "C 1-2" on a left side in the drawing and, at the same time, the guide shaft on the main shaft side is moved to the position "M 3-2" from the position "M 1-2" on a right side in the drawing. With respect to the change of the guide grooves caused by such movement of the guide shafts, the guide groove SC1 is merely changed over from the left position to the right position. Accordingly, the shift fork 81 is moved to the right position from the left position so that the fifth speed driven gear C5 and the third speed driven gear C3 are engaged with each other by way of the dog clutch.

Upon completion of the up-side preliminary shift from the second speed to the third speed, the engagement state of the twin clutch TCL is changed over to the first clutch CL1 from the second clutch CL2. In other words, the shift operation from the second speed to the third speed is completed by merely performing the transfer operation of the clutches. The up-side preliminary shift is performed in the same manner until the fifth speed gear is selected.

At the time of performing the above-mentioned up-side preliminary shift from the second speed to the third speed, the guide groove SC1 passes the neutral position, that is, the position where the meshing by the dog clutch is not performed at the display "C N-2" on the left side in the drawing. A rotational position of the shift drum 30 is detected by the gear position sensor 134, and a rotational speed of the shift drum 30 is finely adjusted by the shift control motor 21. Accordingly, the rotational speed of the shift drum 30 from the display "C 1-2" on the left side in the drawing to the display "C N-2", that is, a speed of the shift drum 30 at the time of releasing a meshed state of the dog clutch between the driven gears C1, C5, and the rotational speed of the shift drum 30 from the display "C N-2" to the display "C 3-2", that is, speed at the time of meshing the dog clutch between the driven gears C5, C3 can be set different from each other, or it is possible to perform "neutral standby" in which the shift drum 30 is stopped for a predetermined time at the position "C N-2". Due to the above-mentioned constitution of the AMT1, for example, when the vehicle is traveling at the second speed gear, the rotational position of the shift drum 30 can be arbitrarily changed among the position "1-2", "N-2" and "3-2".

By executing this neutral standby control which temporarily stops the shift drum 30 at the "neutral standby" position at predetermined timing, it is possible to reduce a shift shock which is liable to easily occur at the time of engagement/disengagement of the dog clutch. Here, the drive timing and the drive speed of the shift drum 30 can be also adjusted suitably corresponding to the number of shift speeds, the engine rotational speed or the like at the time of gear shift.

Here, when the shift drum 30 is at the "neutral standby" position, one shift gear pair of the group of odd-numbered-speed gear pairs or the group of even-numbered-speed gear pairs is in a neutral state. For example, in the above-mentioned "C N-2" position, the dog clutch between the driven gears C2, C6 is meshed, while the driven gear C5 is in a neutral state in which the driven gear C5 is meshed with neither one of the driven gears C1, C3. Accordingly, even when the first clutch CL1 is changed over to an engagement state at this point of time, only the inner main shaft 7 is rotated, and the transmission of the rotational drive force to the counter shaft 9 is not influenced by the changeover of the first clutch CL1.

Figure 7:
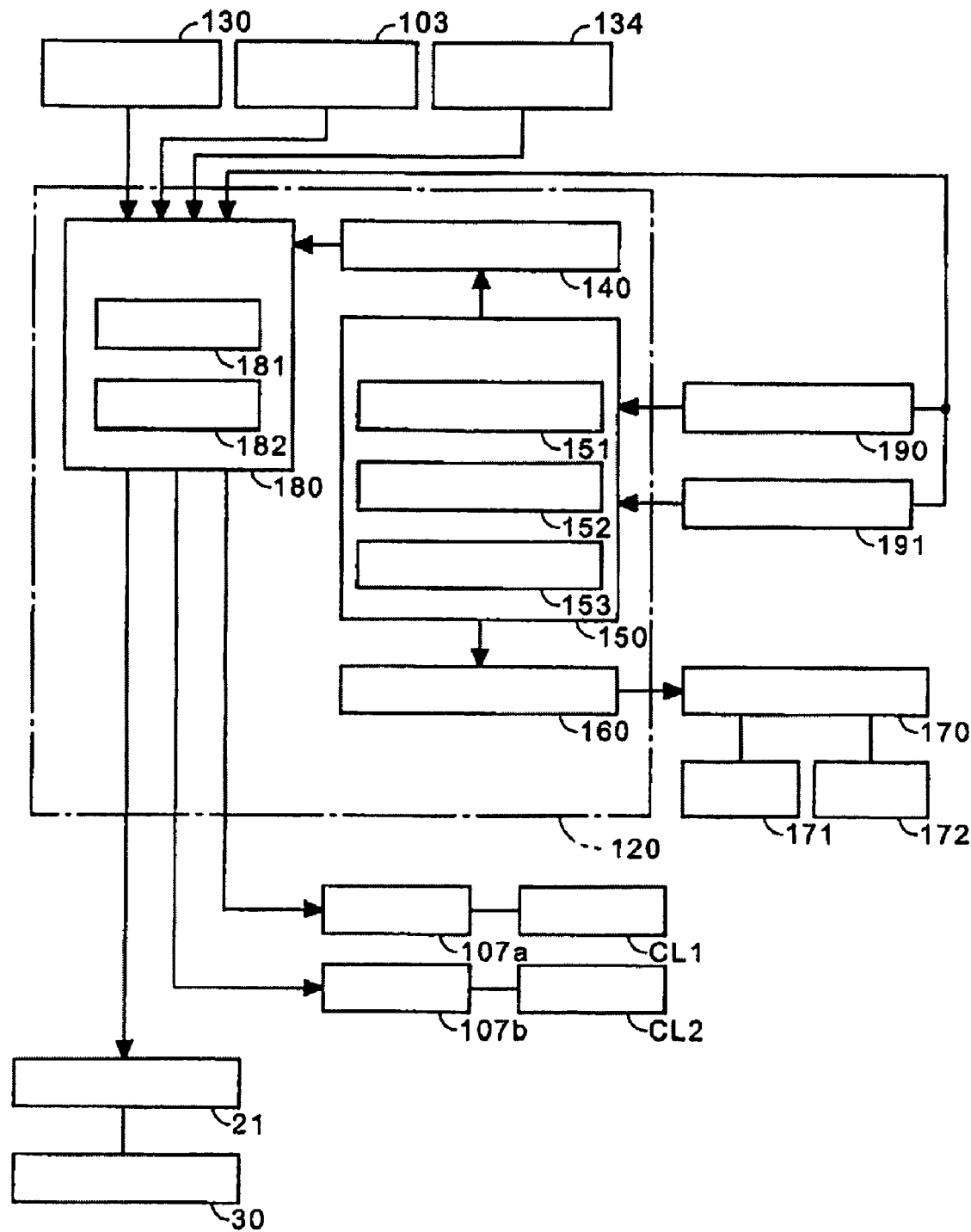
FIG. 7 is a block diagram showing the constitution of an AMT control unit.

FIG. 7 is a block diagram showing the constitution of the AMT control unit 120 which constitutes the shift transmission control device. Symbols which are identical with the symbols used in the previous drawings indicate the identical or similar parts. The AMT control unit 120 includes a shift transmission controller 180 which has a shift map 181 and a timer 182, a shift inhibition instruction part 140 which transmits a shift inhibition instruction to the shift transmission controller 180, a shift inhibition state detection part 150 which detects the establishment of a predetermined shift inhibition condition based on a traveling state of a vehicle, and an ABS operation instruction part 160 which performs a drive control of an ABS control unit 170.

The shift transmission controller 180, during usual traveling of a vehicle, drives the shift control motor 21 and the valve 107 in accordance with the shift map 181 formed of a three-dimensional map and the like based on output signals of the engine rotational speed sensor 130, the throttle opening sensor 103 and the gear position sensor 134 and vehicle-speed information. On the other hand, when the shift inhibition instruction is outputted from the shift inhibition instruction part 140, the shift transmission controller 180 is configured to maintain a shift speed (change gear ratio) at which a rotational drive force is transmitted to the rear wheel WR irrespective of a change of a vehicle speed or the like.

The motorcycle 10 according to this embodiment includes a front-wheel rotational speed sensor 190 and a rear-wheel rotational speed sensor 191. Detection information of both sensors is inputted to the above-mentioned shift transmission controller 180 and the shift inhibition state detection part 150. The rotational speed of the rear wheel WR which constitutes the drive wheel may be calculated based on shift speed information obtained by the gear position sensor 134 and output signals of the inner main shaft rotational speed sensor 131 and the outer main shaft rotational speed sensor 132.

The shift inhibition state detection part 150 includes a slip ratio calculation means 151, a front/rear wheel speed difference calculation means 152 and a deceleration calculation means 153, and is configured to detect that a vehicle is in a shift inhibition state using at least one of these calculation means.

First of all, the slip ratio calculation means 151 calculates a ratio that the front wheel and/or the rear wheel slip, wherein a calculation formula of the ratio is expressed as follows.

slip ratio (%)=100×((vehicle-body vehicle speed)−(slip-side vehicle-wheel vehicle speed))÷(vehicle-body vehicle speed)

For example, assuming the vehicle speed with no slip as 100, when the front-wheel vehicle speed is 100 and the rear-wheel vehicle speed is 80, by setting the front-wheel vehicle speed 100 as the vehicle-body vehicle speed and the rear-wheel vehicle speed 80 as the slip-side vehicle-wheel vehicle speed, the slip ratio of the rear wheel is calculated to 20% (100×(100−80)÷100=20%). Accordingly, when either one of front and rear wheels slips, it is possible to recognize a degree of the slip.

The front/rear wheel speed difference calculation means 152 calculates the difference between the front-wheel rotational speed and the rear-wheel rotational speed. For example, when the front-wheel rotational speed is 100 and the rear-wheel rotational speed is 80, the front/rear wheel rotational speed difference is calculated as 20. Accordingly, when either one of the front and rear wheels slips, it is possible to recognize the degree of the slip.

The deceleration calculation means 153 calculates the decelerations of the front and rear wheels. The deceleration of the front wheel is calculated by the following formula.

$$((\text{front-wheel vehicle speed immediately before time } T) - (\text{current front-wheel vehicle speed})) \div \text{time } T$$

For example, when the front-wheel vehicle speed immediately before time 10 is 100 and current front-wheel vehicle speed is 80, the deceleration of the front wheel is calculated as $2((100-80) \div 10 = 2)$. The rear-wheel deceleration can be calculated in the same manner. When the difference arises between the front-wheel deceleration and the rear-wheel deceleration, a degree of the slip can be detected by assuming that the wheel having the larger deceleration slips. Further, when the deceleration of the front-wheel and the deceleration of the rear-wheel are equal, it is recognized that both of the front and rear wheels are decelerated without slip or the front and rear wheels slip at the same degree.

The shift inhibition state detection part 150 is configured to recognize the establishment of the shift inhibition condition when at least one of the slip ratios of the front/rear wheel, the rotational speed difference between the front and rear wheels and the decelerations of the front and rear wheels reaches a predetermined value such as a case when the slip ratio of the rear wheel exceeds a predetermined value.

The motorcycle of this embodiment includes an ABS (anti lock brake system) which enables stable braking in such a manner that when locking of the wheel is detected at the time of deceleration of the vehicle, a braking force applied to at least one of a front-wheel-side brake 171 and a rear-wheel-side brake 172 is instantaneously and intermittently released. The ABS control unit 170 which performs a drive control of the front-wheel-side brake 171 and the rear-wheel-side brake 172 irrespective of an operation of a rider for preventing locking of the wheel is driven in response to an operation instruction from the ABS operation instruction part 160.

In the ABS operation instruction part 160 of this embodiment, an operation condition of the ABS is set equal to the above-mentioned predetermined shift inhibition condition. Accordingly, in this embodiment, when the establishment of the predetermined shift inhibition condition is detected by the shift inhibition state detection part 150, the change of the shift speed at which a rotational drive force is transmitted is inhibited by the shift transmission controller 180 and, at the same time, an operation instruction is transmitted to the ABS control unit 170 from the ABS operation instruction part 160.

As described previously, the AMT 1 of this embodiment can, in a state that the change gear ratio at which the rotational drive force is transmitted is maintained, perform the preliminary shift which allows the selection of other change gear ratio by only performing a drive control of the twin clutch TCL. Further, the AMT control unit 120 of this embodiment is characterized in that upon detection of the establishment of the predetermined shift inhibition condition based on the traveling state of the vehicle, the AMT control unit 120 inhibits the change of the change gear ratio at which the rotational drive force is transmitted and, at the same time, executes the preliminary shift. The operation of the AMT 1 when the shift inhibition condition is detected is explained hereinafter in conjunction with FIG. 8 and FIG. 9.

Figure 8:
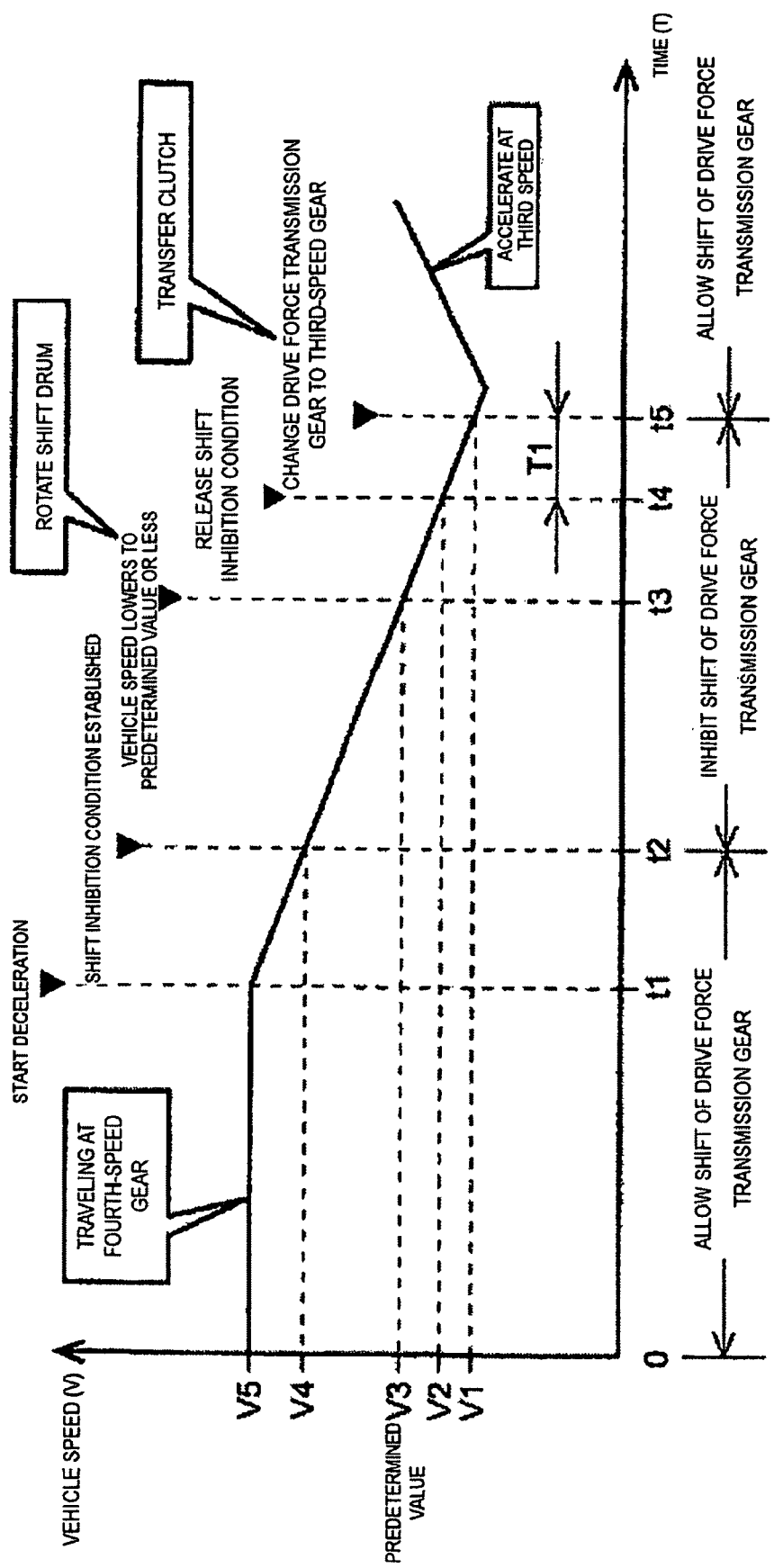
FIG. 8 is a timing chart showing an operational example of the AMT when a shift inhibition condition is established during traveling.

FIG. 8 is a timing chart showing an example of the operation of the AMT 1 when the shift inhibition condition is established during traveling of the vehicle. This timing chart shows the example of the operation in which the deceleration is started during traveling with the fourth speed gear and the shift inhibition condition is established during the deceleration. First of all, at a point of time t0, the vehicle is in steady driving at a vehicle speed V5 of fourth speed gear. Here, the shift drum 30 of the shift mechanism 20 (see FIG. 6) assumes the position "N-4" ("C N-4" and "M N-4"). Further, the second clutch CL2 is engaged and, at the same time, the first clutch CL1 is disengaged.

At a point of time t1, the deceleration is started with a brake operation of a rider. When the slip ratio of the wheel exceeds the predetermined value or other factor relating to the shift inhibition is detected, the predetermined shift inhibition condition is established. In this operational example, the predetermined shift inhibition condition is established when the vehicle speed becomes V4 at a point of time t2. In response to the establishment of the predetermined shift inhibition condition, the shift transmission controller 180 inhibits the change of the change gear ratio at which the rotational drive force is transmitted to the rear wheel. That is, the gears which transmit the rotational drive force is held at the fourth speed gear. Further, the ABS operation instruction part 160 transmits an operation instruction to the ABS control unit 170 in response to the establishment of the shift inhibition condition and the ABS starts an operation thereof.

The above-mentioned inhibition of the change of the change gear ratio is particularly effective when the inhibition is performed during the operation of the ABS. For example, when the automatic shift corresponding to a rotational speed of a locked wheel is performed at the time of rapid deceleration which necessitates the operation of the ABS, there exists a possibility that an excessively large engine brake is generated. However, by inhibiting the change of the change gear ratio, it is possible to perform the deceleration by making use of a frictional force between a tire and a load surface at maximum by the ABS.

At a point of time t3, due to the continuation of the deceleration of the vehicle, the vehicle speed arrives at a predetermined value V3. Accordingly, the shift transmission controller 180 rotates the shift drum 30 so as to execute the preliminary shift which sets the position of the shift drum 30 to the positions "C 3-4" and "M 3-4" from the positions "C N-4" and "M N-4". Due to such preliminary shift, in a state that the change gear ratio of fourth speed gear at which the rotational drive force is transmitted to the rear wheel is maintained, it is possible to finish the preparation for changing over the change gear ratio from the fourth speed gear to third speed gear by only performing the transfer operation of the twin clutch TCL.

When the deceleration of the vehicle is continued and the slip ratio of the wheel is lowered to a value below a predetermined value, the shift inhibition condition is released. In this operational example, the shift inhibition condition is released at the vehicle speed V3 at a point of time t4. The ABS operation instruction part 160 according to this embodiment is configured to operate the ABS only during a period in which the shift inhibition condition is established and hence, the operation of the ABS is stopped at the point of time t4. On the other hand, it is set such that the inhibition of the change of the change gear ratio at which the rotational drive force is transmitted is released after a lapse of a predetermined time from the release of the shift inhibition condition. This setting is made to enable the change of the change gear ratio in a state that a traveling state of the vehicle is stable by waiting for the lapse of the predetermined time.

The shift transmission controller 180 measures the lapsed time from releasing of the shift inhibition condition using the timer 182. At a point of time t5 at which the lapsed time becomes a predetermined time T1, the shift gears which transmit the rotational drive force to the rear wheel are changed over from the fourth speed to the third speed. This changeover operation is completed by performing only the so-called clutch transfer operation in which the second clutch CL2 is brought into a disengagement state from an engagement state and, at the same time, the first clutch CL1 is brought into an engagement state from a disengagement state. Accordingly, compared to the constitution which executes the shift down by rotating the shift drum after releasing of the shift inhibition condition, it is possible to rapidly change the change gear ratio at which the rotational driving force is transmitted.

By adopting the above-mentioned constitution, even when the vehicle speed is lowered during a period before the release of the shift inhibition condition, it is possible to perform the smooth reacceleration by immediately applying the change gear ratio on the low-speed side without rotating the shift drum 30. In this embodiment, although the vehicle speed is lowered to V1 at the point of time t5, it is possible to perform the smooth reacceleration using the third speed gears on a side lower than the fourth speed gears before the establishment of the shift inhibition condition. Here, until the first clutch CL1 is engaged at the point of time t5, the first clutch CL1 is held in a complete disengagement state or may be rotated together with the second clutch CL2 by applying a slight oil pressure for making meshing of the dog clutch and releasing of such meshing smooth.

Here, the steady traveling by the fourth-speed gears from the point of time t0 to the point of time t1 may be performed with the shift drum 30 set at the position "C 4-5" and the position "M 4-5". In this case, at the point of time t3, the shift drum 30 is rotated to the position "C 3-4" and the position "M 3-4" from the position "C 5-4" and the position "M 5-4".

Here, in this embodiment, the ABS operation condition is set equal to the shift inhibition condition. However, both conditions may be set different from each other. Further, the shift transmission control device according to the present invention is also applicable to a vehicle which is not provided with an ABS.

Figure 9:
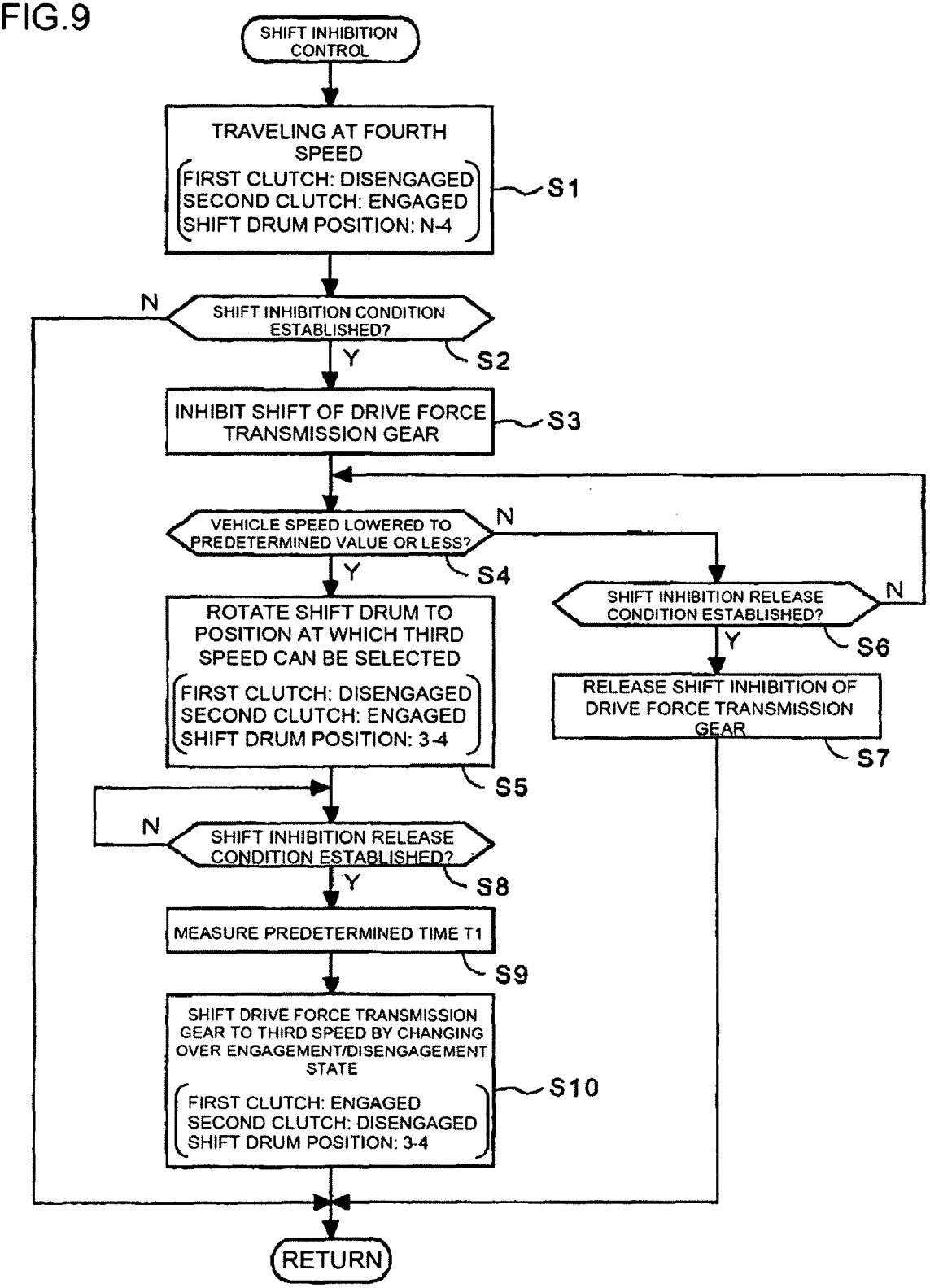
FIG. 9 is a flowchart showing a flow of a shift inhibition control according to an embodiment of the present invention.

FIG. 9 is a flowchart showing the flow of the shift inhibition control of this embodiment. This flowchart corresponds to the timing chart shown in FIG. 8. In step S1, the vehicle is in the traveling state in which the rotational drive force is transmitted to the rear wheel with the fourth-speed gears. At this point of time, with respect to the state of the AMT1, the first clutch CL1 is in a disengagement state, the second clutch CL2 is in an engagement state, and the shift drum 30 is at the position "N-4" (see FIG. 6).

In step S2, it is determined whether or not the shift inhibition condition is established. When the affirmative determination is made in step S2, the processing advances to step S3 where the shift of the drive force transmission gears is inhibited. Here, the shift gears which transmit the rotational drive force to the rear wheel are held at the fourth speed. When the negative determination is made in step S2, a series of control is finished.

In next step S4, it is determined whether or not the vehicle speed of the vehicle is lowered to a predetermined value or less. When the affirmative determination is made in step S4, the processing advances to step S5 where the shift drum 30 is rotated to the position which allows the selection of the third speed gears. At this point of time, the AMT 1 rotates the shift drum 30 to the position "3-4" (see FIG. 6) in a state that the disengagement state of the first clutch CL1 and the engagement state of the second clutch CL2 are maintained.

In next step S8, it is determined whether or not the shift inhibition condition is released. When the affirmative determination is made, in step S9, the predetermined time T1 is measured using the timer 182. When the negative determination is made in step S8, the processing returns to step S8 and the determination is performed again. Then, when the predetermined time T1 elapses, the shift transmission controller 180 changes over the engagement/disengagement state of the clutches in step S10 so as to shift the drive force transmission gears to the third speed. The operation of the AMT1 in step S10 is performed such that the first clutch CL1 is engaged and the second clutch CL2 is disengaged in a state that the shift drum 30 is held at the position "3-4".

Here, when the negative determination is made in step S4, it is determined whether or not the shift inhibition condition is released in step S6. When the negative determination is made in step S6, the processing returns to step S4. On the other hand, when the affirmative determination is made in step S6, that is, when the shift inhibition condition is released before the vehicle speed becomes the predetermined value or less in step S6, it is determined that the preliminary shift to the third speed is unnecessary and the processing advances to step S7. In step S7, the shift inhibition of the drive force transmission gears is released and a series of control is finished.

Figure 10:
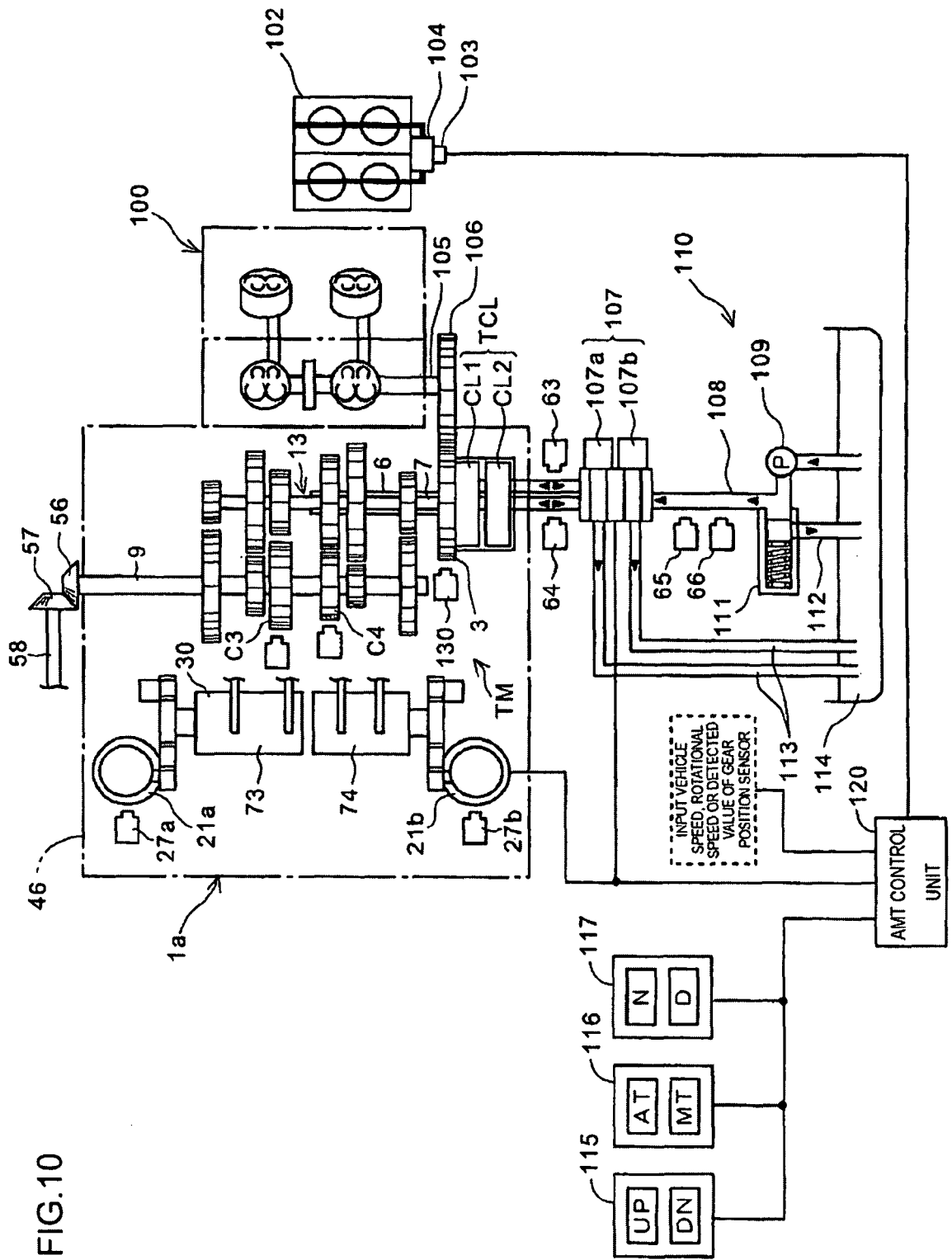
FIG. 10 is a system constitutional view of an AMT and peripheral devices of the AMT according to a second embodiment of the present invention.

FIG. 10 is a view showing the system constitution of an AMT1a and a peripheral device thereof according to a second embodiment of the present invention. Symbols equal to the symbols used in the first embodiment indicate identical or similar parts. The AMT1a according to this embodiment is characterized in that the AMT1a includes two shift drums for changing over shift gear pairs and two shift drums are independently subject to a drive control. To be more specific, with respect to gear pairs of first to sixth speeds, the AMT1a includes a first shift drum 73 relating to a group of odd-numbered-speed gear pairs (first, third and fifth speeds) and a second shift drum 74 relating to a group of even-numbered-speed gear pairs (second, fourth and sixth speeds). The first and second shift drums 73, 74 are respectively rotatably driven by shift control motors 21a, 21b. Further, the shift control motors 21a, 21b are respectively provided with shifter sensors 27a, 27b.

Due to the above-mentioned constitution, the AMT1a can set the shift position which can be selected by performing only the drive control of the clutch after releasing the shift inhibition condition not only above one speed or below one speed but also above three speeds or below three speeds.

Figure 11:
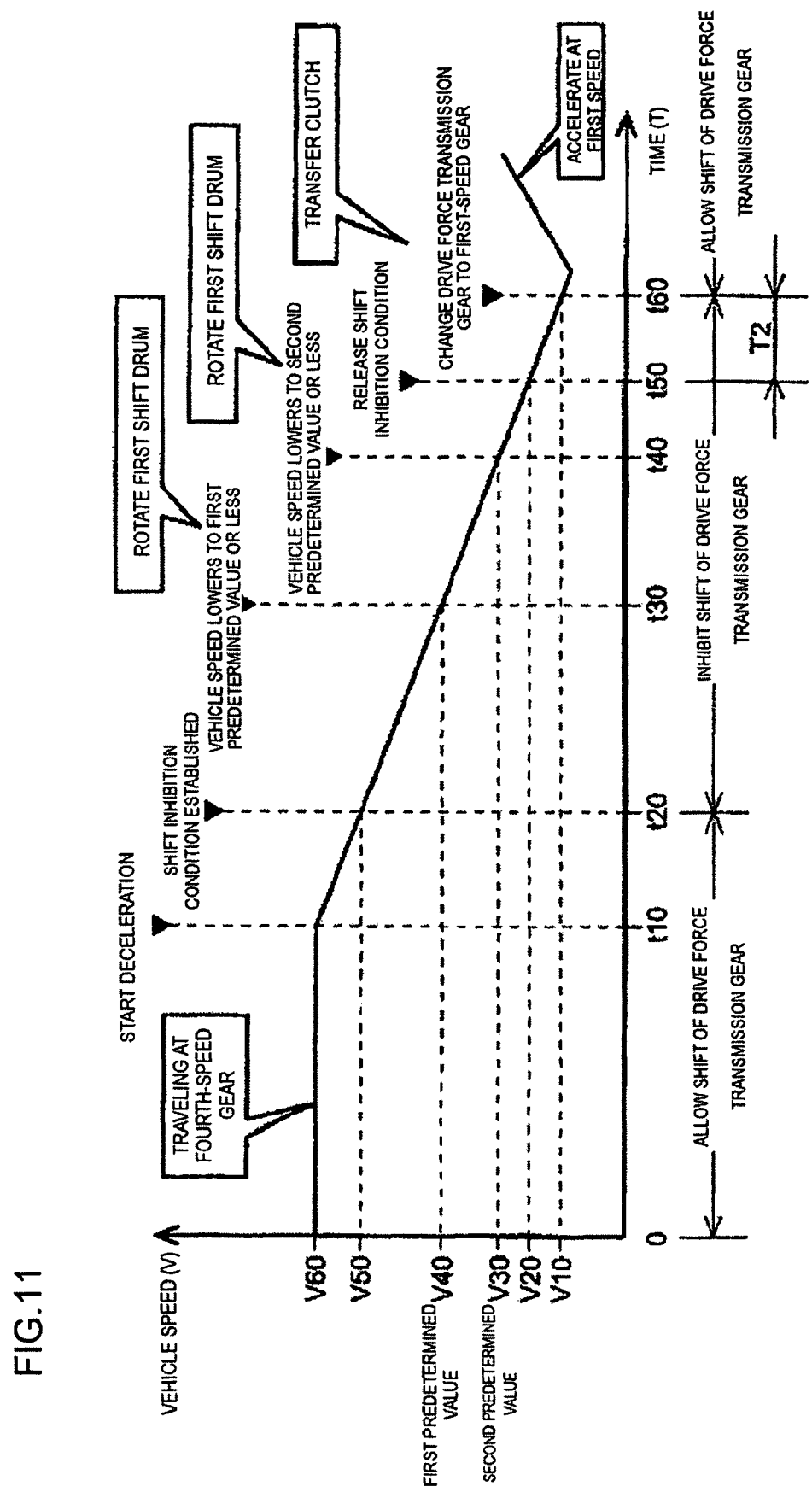
FIG. 11 is a timing chart showing an operational example of the AMT according to the second embodiment.

FIG. 11 is a timing chart showing an operational example of the AMT1a when the shift inhibition condition is established during traveling. In the same manner as FIG. 8, FIG. 11 shows an operation in which the deceleration of the vehicle is started during traveling with the fourth speed gears and the shift inhibition condition is established during the deceleration. First of all, at a point of time t0, the vehicle is in steady traveling with a vehicle speed V60 of fourth speed gears. Here, the first shift drum 73 is at a neutral standby (N) position and the second shift drum 74 is at a fourth speed position. Further, the second clutch CL2 is in an engagement state and the first clutch CL1 is in a disengagement state.

Next, the deceleration is started at a point of time t10, and the establishment of the predetermined shift inhibition condition is detected at a point of time t20 at which the vehicle speed becomes V50. Accordingly, the shift transmission controller 180 inhibits a change of a change gear ratio at which a rotational drive force is transmitted to a rear wheel. That is, the gears which transmit the rotational drive force are held at the fourth speed. Further, the ABS control unit 170 operates ABS in response to the establishment of the shift inhibition condition.

At a next point of time t30, the vehicle speed reaches a first predetermined value V40. Accordingly, the shift transmission controller 180 rotates the first shift drum 73 and executes a preliminary shift for changing the first shift drum 73 from the neutral standby state to a position which allows the selection of the third speed. Due to this preliminary shift, in a state that the change gear ratio of the fourth speed gears at which the rotational drive force is transmitted to the rear wheel is maintained, it is possible to perform the preparation for changing the change gear ratio to the third speed gears by performing only the transfer operation of a twin clutch TCL.

Then, at a point of time t40, the deceleration of the vehicle is further continued and the vehicle speed reaches a second predetermined value V30. Accordingly, the shift transmission controller 180 rotates the first shift drum 73 again thus executing a preliminary shift which changes a shift position from a position which allows the selection of the third speed to a position which allows the selection of the first speed. Due to this second preliminary shift, in a state that the change gear ratio of fourth speed gears at which a rotational drive force is transmitted to the rear wheel is maintained, it is possible to perform the preparation for changing over the change gear ratio to the first speed gears by performing only the transfer operation of the twin clutch TCL.

The above-mentioned AMT1 of the first embodiment is configured to change the shift position using one shift drum 30 and hence, a range in which the preliminary shift can be executed with the dog clutch of fourth speed held in a meshed state is limited to the shift one speed above or the shift one speed below. To the contrary, the AMT1a of this embodiment includes two shift drums and hence, the shift in the group of odd-numbered-speed gear pairs and the shift in the group of even-numbered-speed gear pairs can be separately and independently executed. Accordingly, the shift positions which are selectable by performing only a drive control of the clutch after releasing the shift inhibition condition can be set not only to the shift position one speed above or the shift position one speed below but also to the shift position three speeds above or the shift position three speeds below.

Then, at a point of time t50 at which the vehicle speed becomes V20 after deceleration of the vehicle is further continued, the shift inhibition condition is released due to lowering of a slip ratio of a wheel to a value below a predetermined value or the like, and an operation of the ABS is also stopped along with such release of the shift inhibition condition. Then, the shift transmission controller 180 measures a time elapsed after the release of the shift inhibition condition using the timer 182, and changes over the shift gear for transmitting the rotational drive force to the rear wheel from the fourth speed to the first speed at a point of time t60 at which a lapsed time becomes a predetermined time T2.

Due to the above-mentioned constitution, even when the deceleration of the vehicle until the shift inhibition condition is released is large, it is possible to smoothly reaccelerate the vehicle by applying the change gear ratio of first speed gear without rotating the shift drum. In this embodiment, although the vehicle speed is lowered to V10 at the point of time t60, the vehicle speed can be immediately reaccelerated at the first speed gear thereafter.

Figure 12A:
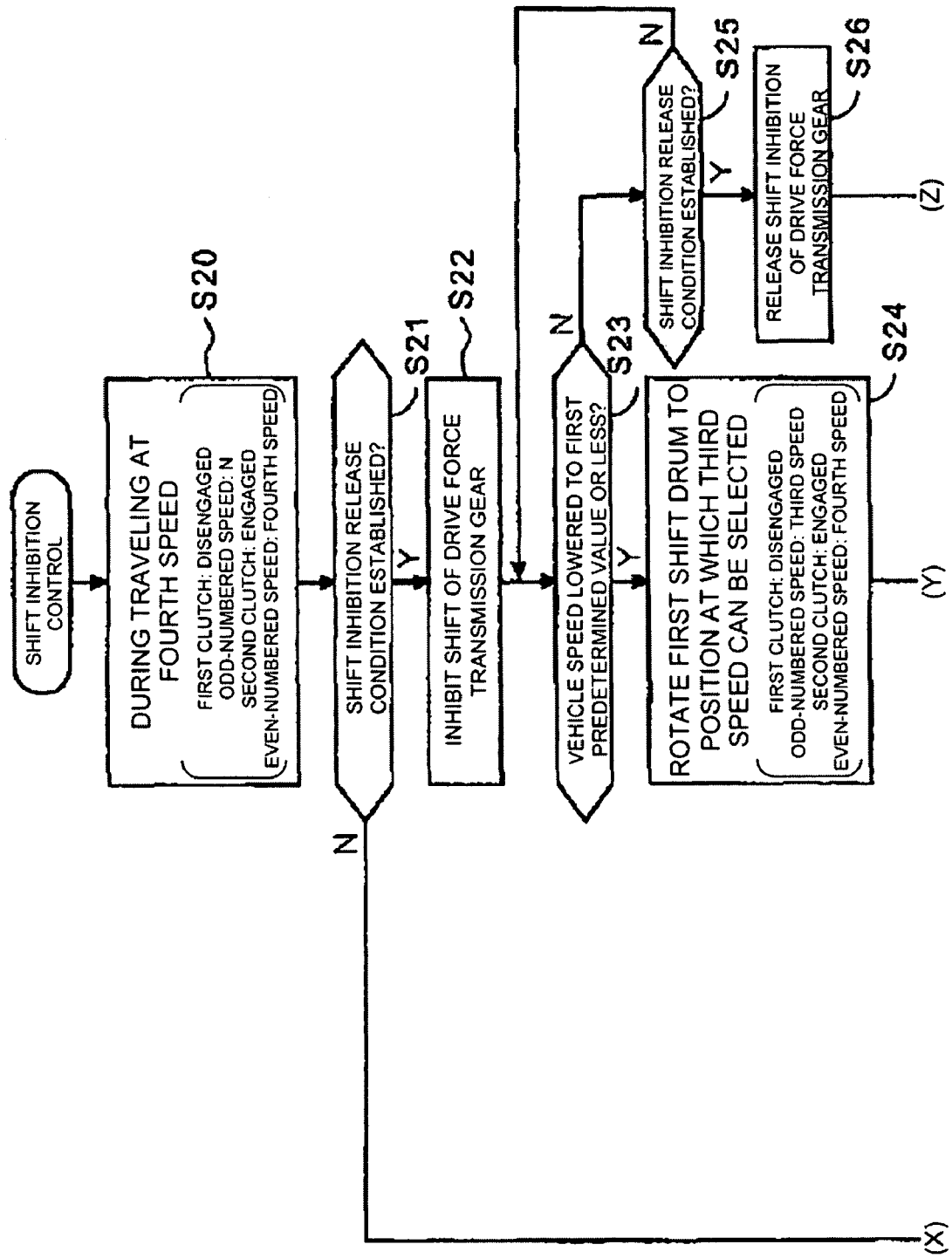
FIGS. 12A and 12B are flow charts showing a flow of a shift inhibition control according to the second embodiment of the present invention.
Figure 12B:
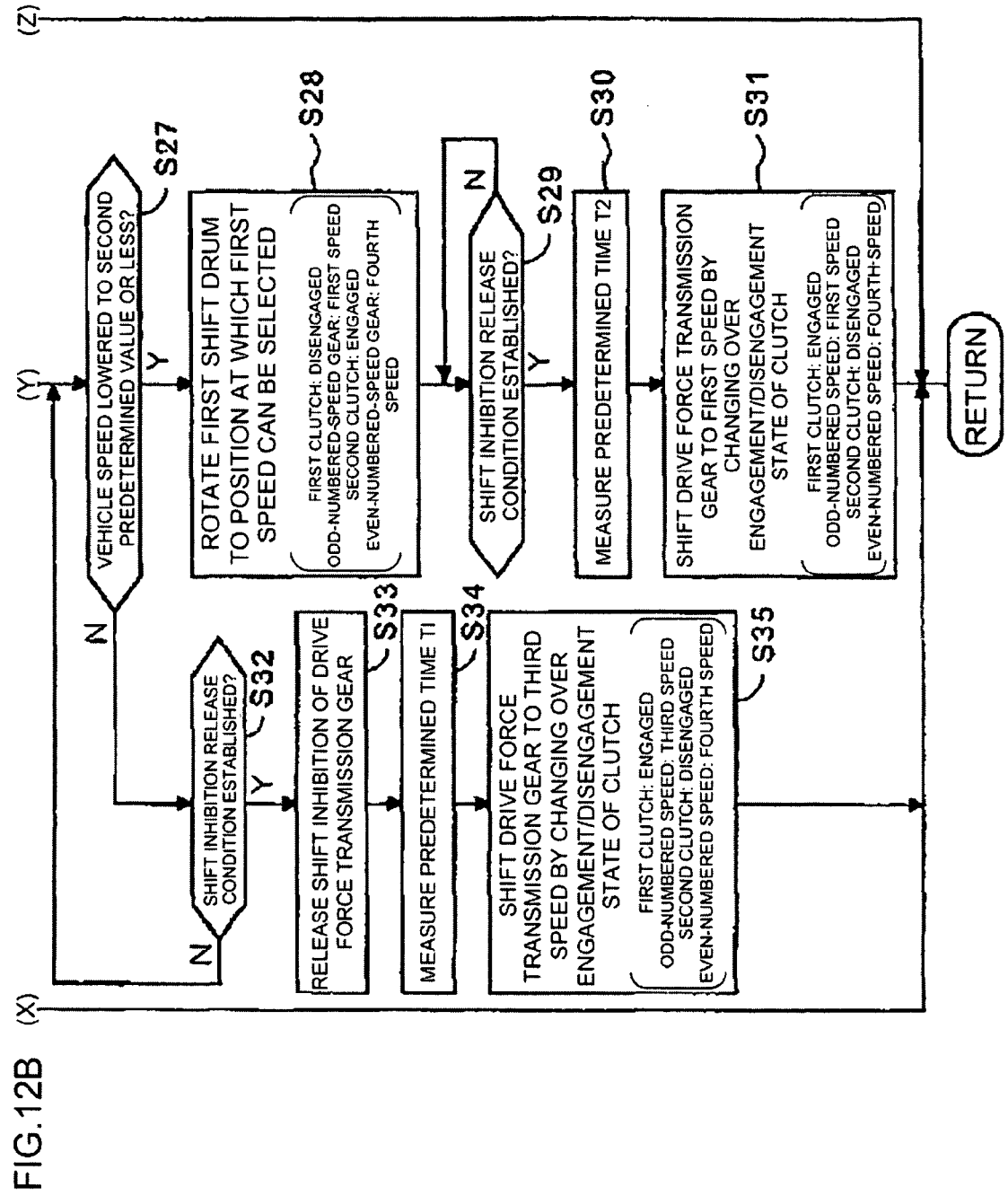

FIGS. 12A and 12B are flowcharts showing the flow of the shift inhibition control of the second embodiment of the present invention. This flowchart corresponds to the timing chart shown in FIG. 11. In step S20, the vehicle is in the traveling state in which the rotational drive force is transmitted to the rear wheel with the fourth-speed gears. At this point of time, with respect to the state of the AMT1a, the first clutch CL1 is in a disengagement state, the second clutch CL2 is in an engagement state, the first shift drum 73 is at a neutral standby position (N) and the second shift drum 74 is at a fourth speed position.

In step S21, it is determined whether or not the shift inhibition condition is established. When the affirmative determination is made in step S21, the processing advances to step S22 where the shift of the drive force transmission gears is inhibited. When the negative determination is made in step S21, a series of control is finished.

In next step S23, it is determined whether or not the vehicle speed is lowered to a first predetermined value or less. When the affirmative determination is made in step S23, the processing advances to step S24 where the first shift drum 73 is rotated to the position which allows the selection of the third speed gears. At this point of time, the AMT1a maintains the disengagement state of the first clutch CL1 and the engagement state of the second clutch CL2.

In next step S27, it is determined whether or not the vehicle speed is lowered to a second predetermined value or less. When the affirmative determination is made in step S27, the processing advances to step S28 where the first shift drum 73 is rotated to the position which allows the selection of the first speed gears. At this point of time, the AMT1a maintains the disengagement state of the first clutch CL1 and the engagement state of the second clutch CL2.

Here, when the negative determination is made in the above-mentioned step S23, in step S25, it is determined whether or not the shift inhibition condition is released. When the negative determination is made in step S25, the processing returns to step S23. On the other hand, when the affirmative determination is made in step S25, that is, when the shift inhibition condition is released before the vehicle speed becomes the first predetermined value or less, it is determined that the preliminary shift to third speed is not necessary and the processing advances to step S26. In step S26, the shift inhibition of the drive force transmission gear is released and a series of control is finished.

On the other hand, in step S29, it is determined whether or not the shift inhibition condition is released. When the affirmative determination is made, in step S30, the predetermined time T2 is measured using the timer 182. When the negative determination is made in step S29, the processing returns to step S29 and the determination is performed again. Then, when the predetermined time T2 elapses, the shift transmission controller 180 changes over the engagement/disengagement state of the clutches in step S31 so as to shift the drive force transmission gears to the first speed. The operation of the AMT1a in step S31 is performed such that the first clutch CL1 is engaged and the second clutch CL2 is disengaged in a state that the first shift drum 73 is held at the first speed position.

Here, when the negative determination is made in step S27, the processing advances to step S32 where it is determined whether or not the shift inhibition condition is released. When the negative determination is made in step S32, the processing returns to step S27. On the other hand, when the affirmative determination is made in step S32, that is, when the shift inhibition condition is released before the vehicle speed becomes the second predetermined value or less in step S32, it is determined that the preliminary shift to the first speed is unnecessary and the processing advances to step S33. In step S33, the shift inhibition of the drive force transmission gears is released. In next step S34, the predetermined time T1 is measured by the timer 182. When the predetermined time T1 elapses, the shift transmission controller 180 changes over the engagement/disengagement state of clutches in step S35 so as to change the drive force transmission gear to third speed. In step S35, the AMT1a is operated so as to engage the first clutch CL1 and disengage the second clutch CL2 in a state that the first shift drum 73 is held at the third speed position.

As described above, according to the shift transmission control device according to the embodiment of the present invention, when the shift inhibition condition is established, the change of the change gear ratio at which the rotational drive force is transmitted is inhibited and, at the same time, in the state that the change gear ratio at which the rotational drive force is transmitted is maintained, the preliminary shift which allows the selection of other change gear ratio by merely performing the drive control of the clutch can be executed. Due to such an operation, when the shift inhibition condition is released, it is possible to rapidly change the change gear ratio at which the rotational drive force is transmitted by merely changing over the engagement/disengagement state of the clutches without driving the transmission. Accordingly, even when the vehicle speed is decelerated before the shift inhibition condition is released, it is possible to perform the reacceleration by rapidly adopting the change gear ratio closer to the low speed.

Further, as explained in conjunction with the second embodiment, when the shift transmission control device includes the first shift drum and the second shift drum which separately perform the selection of the gear within the group of odd-numbered-speed gear pairs and the selection of the gear within the group of even-numbered-speed gear pairs, after the shift inhibition condition is released, it is possible to take the shift position which is selectable only by performing the drive control of the clutches not only at the shift position one speed above or the shift position one speed below but also at the shift position three speeds above or the shift position three speeds below. Accordingly, for example, in the six-speed-type transmission, when the shift inhibition condition is established during the deceleration in the fourth speed traveling, it is possible to set the shift gear at the time of reacceleration after the shift inhibition condition is released to the third speed or the first speed and hence, the shift transmission control device can cope with a broad change of vehicle speed which occurs during the establishment of the shift inhibition condition.

The constitution of the AMT, the AMT control unit and the like, the establishment requirements of the shift inhibition condition, setting of the predetermined time until the change gear ratio is changed over by driving the clutch after releasing the shift inhibition condition, the operation condition of the ABS and the like are not limited to those described in the above-mentioned embodiments, and various modifications are conceivable. Further, the application of the shift transmission control device of the present invention is not limited to the motorcycle and the shift transmission control device of the present invention is also applicable to a shift device used for a three-wheeled vehicle, a four-wheeled vehicle or the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shift transmission control device of a vehicle, comprising:
    a transmission configured to transmit a rotational drive force generated by a power source to a drive wheel at a predetermined change gear ratio;
    a clutch configured to connect and disconnect the power source and the drive wheel in order to and not to transmit the rotational drive force;
    a shift transmission controller configured to control the transmission and the clutch;
    a shift inhibition state detector configured to detect based on a running state of the vehicle that a predetermined shift inhibition condition is satisfied;
    a front wheel rotational speed sensor configured to detect a rotational speed of a front wheel of the vehicle; and
    a rear wheel rotational speed sensor configured to detect a rotational speed of a rear wheel of the vehicle,
    wherein the transmission is capable of providing a preliminary change gear ratio while the predetermined change gear ratio at which the rotational drive force is transmitted to the drive wheel is maintained,
    wherein the shift transmission controller is configured to control the transmission to inhibit a change of the predetermined change gear ratio at which the rotational drive force is transmitted to the drive wheel and to provide the preliminary change gear ratio in response to the running state of the vehicle when the shift inhibition condition is satisfied, and
    wherein the shift inhibition state detector is configured to determine that the shift inhibition condition is satisfied when at least one of a slip ratio of the front wheel and the rear wheel, rotational speed difference between the front wheel and the rear wheel, and deceleration of the front wheel and the rear wheel which are calculated based on detection values detected by the front wheel rotational speed sensor and the rear wheel rotational speed sensor becomes to be equal to or larger than a predetermined value.

2. The shift transmission control device according to claim 1,
    wherein the transmission comprises
        a plurality of gear units arranged between a main shaft and a counter shaft, the main shaft comprising an outer main shaft and an inner main shaft which is rotatably provided in the outer main shaft, the plurality of gear units comprising an odd-numbered-speed gear group relating to the inner main shaft and an even-numbered-speed gear group relating to the outer main shaft, and
        a shift mechanism configured to select one gear unit from the gear units to transmit the rotational drive force,
    wherein the clutch comprises
        a first clutch configured to transmit the rotational drive force to the inner main shaft, and
        a second clutch configured to transmit the rotational drive force to the outer main shaft, and
    wherein, upon satisfying the shift inhibition condition, the shift transmission controller is configured to change a shift position of one of the odd-numbered-speed gear group and the even-numbered-speed gear group to a preliminary shift position by using the shift mechanism, while a shift position of another of the odd-numbered-speed gear group and the even-numbered-speed gear group is maintained, the another of the odd-numberedspeed gear group and the even-numbered-speed gear group including said one gear unit which transmit the rotational drive force.

3. The shift transmission control device of a vehicle according to claim 2,
wherein the shift mechanism comprises a shift drum which is configured to drive a shift fork engaged with the plurality of gear units, and
wherein the shift drum comprises
a first shift drum configured to select a gear unit from the odd-numbered-speed gear group, and
a second shift drum configured to select a gear unit from the even-numbered-speed gear group.

4. The shift transmission control device according to claim 2, wherein the shift transmission controller is configured to change the shift position of said one of the odd-numbered-speed gear group and the even-numbered-speed gear group to a lower shift position when a vehicle speed of the vehicle becomes to be equal to or less than a predetermined value while the shift inhibition condition is satisfied.

5. The shift transmission control device according to claim 1, wherein the shift transmission controller is configured to change the predetermined change gear ratio to the preliminary change gear ratio which corresponds to the preliminary shift position by controlling the clutch after a predetermined time has lapsed from a timing at which the shift inhibition condition was dissatisfied.

6. A vehicle comprising:
a power source;
a drive wheel;
a transmission configured to transmit a rotational drive force generated by the power source to the drive wheel at a predetermined change gear ratio;
a clutch configured to connect and disconnect the power source and the drive wheel in order to and not to transmit the rotational drive force;
a shift transmission controller configured to control the transmission and the clutch;
a shift inhibition state detector configured to detect based on a running state of the vehicle that a predetermined shift inhibition condition is satisfied;
a front wheel rotational speed sensor configured to detect a rotational speed of a front wheel of the vehicle; and
a rear wheel rotational speed sensor configured to detect a rotational speed of a rear wheel of the vehicle,
wherein the transmission is capable of providing a preliminary change gear ratio while the predetermined change gear ratio at which the rotational drive force is transmitted to the drive wheel is maintained,
wherein the shift transmission controller is configured to control the transmission to inhibit a change of the predetermined change gear ratio at which the rotational drive force is transmitted to the drive wheel and to provide the preliminary change gear ratio in response to the running state of the vehicle when the shift inhibition condition is satisfied, and
wherein the shift inhibition state detector is configured to determine that the shift inhibition condition is satisfied when at least one of a slip ratio of the front wheel and the rear wheel, rotational speed difference between the front wheel and the rear wheel, and deceleration of the front wheel and the rear wheel which are calculated based on detection values detected by the front wheel rotational speed sensor and the rear wheel rotational speed sensor becomes to be equal to or larger than a predetermined value.

7. The vehicle according to claim 6,
wherein the transmission comprises
a plurality of gear units arranged between a main shaft and a counter shaft, the main shaft comprising an outer main shaft and an inner main shaft which is rotatably provided in the outer main shaft, the plurality of gear units comprising an odd-numbered-speed gear group relating to the inner main shaft and an even-numbered-speed gear group relating to the outer main shaft, and
a shift mechanism configured to select one gear unit from the gear units to transmit the rotational drive force,
wherein the clutch comprises
a first clutch configured to transmit the rotational drive force to the inner main shaft, and
a second clutch configured to transmit the rotational drive force to the outer main shaft, and
wherein, upon satisfying the shift inhibition condition, the shift transmission controller is configured to change a shift position of one of the odd-numbered-speed gear group and the even-numbered-speed gear group to a preliminary shift position by using the shift mechanism, while a shift position of another of the odd-numbered-speed gear group and the even-numbered-speed gear group is maintained, the another of the odd-numbered-speed gear group and the even-numbered-speed gear group including said one gear unit which transmit the rotational drive force.

8. The vehicle according to claim 7,
wherein the shift mechanism comprises a shift drum which is configured to drive a shift fork engaged with the plurality of gear units, and
wherein the shift drum comprises
a first shift drum configured to select a gear unit from the odd-numbered-speed gear group, and
a second shift drum configured to select a gear unit from the even-numbered-speed gear group.

9. The vehicle according to claim 7, wherein the shift transmission controller is configured to change the shift position of said one of the odd-numbered-speed gear group and the even-numbered-speed gear group to a lower shift position when a vehicle speed of the vehicle becomes to be equal to or less than a predetermined value while the shift inhibition condition is satisfied.

10. The vehicle according to claim 6, wherein the shift transmission controller is configured to change the predetermined change gear ratio to the preliminary change gear ratio which corresponds to the preliminary shift position by controlling the clutch after a predetermined time has lapsed from a timing at which the shift inhibition condition was dissatisfied.

11. A shift transmission control device of a vehicle, comprising:
transmission means for transmitting a rotational drive force generated by a power source to a drive wheel at a predetermined change gear ratio;
clutch means for connecting and disconnecting the power source and the drive wheel in order to and not to transmit the rotational drive force;
shift transmission controlling means for controlling the transmission means and the clutch means;
shift inhibition state detecting means for detecting based on a running state of the vehicle that a predetermined shift inhibition condition is satisfied;
front wheel rotational speed detecting means for detecting a rotational speed of a front wheel of the vehicle; and rear wheel rotational speed detecting means for detecting a rotational speed of a rear wheel of the vehicle, wherein the transmission means is capable of providing a preliminary change gear ratio while the predetermined change gear ratio at which the rotational drive force is transmitted to the drive wheel is maintained, wherein the shift transmission controlling means is for controlling the transmission means to inhibit a change of the predetermined change gear ratio at which the rotational drive force is transmitted to the drive wheel and to provide the preliminary change gear ratio in response to the running state of the vehicle when the shift inhibition condition is satisfied, and wherein the shift inhibition state detecting means is for determining that the shift inhibition condition is satisfied when at least one of a slip ratio of the front wheel and the rear wheel, rotational speed difference between the front wheel and the rear wheel, and deceleration of the front wheel and the rear wheel which are calculated based on detection values detected by the front wheel rotational speed detecting means and the rear wheel rotational speed detecting means becomes to be equal to or larger than a predetermined value.

12. A method for controlling shift transmission in a vehicle, comprising:

transmitting a rotational drive force generated by a power source to a drive wheel at a predetermined change gear ratio;

connecting and disconnecting the power source and the drive wheel via a clutch in order to and not to transmit the rotational drive force;

detecting a rotational speed of a front wheel of the vehicle;

detecting a rotational speed of a rear wheel of the vehicle;

detecting based on a running state of the vehicle that a predetermined shift inhibition condition is satisfied;

inhibiting a change of the predetermined change gear ratio at which the rotational drive force is transmitted to the drive wheel when the shift inhibition condition is satisfied; and providing a preliminary change gear ratio in response to the running state of the vehicle while the predetermined change gear ratio is maintained when the shift inhibition condition is satisfied, wherein the detecting that a predetermined shift inhibition condition is satisfied includes determining that the shift inhibition condition is satisfied when at least one of a slip ratio of the front wheel and the rear wheel, rotational speed difference between the front wheel and the rear wheel, and deceleration of the front wheel and the rear wheel which are calculated based on detected rotational speeds of the front wheel and the rear wheel becomes to be equal to or larger than a predetermined value.

* * * * *